United States Patent
Kim et al.

(10) Patent No.: US 12,225,645 B2
(45) Date of Patent: Feb. 11, 2025

(54) DISPLAY APPARATUS AND METHOD OF CONTROLLING THE SAME

(71) Applicant: SAMSUNG ELECTRONICS CO., LTD., Suwon-si (KR)

(72) Inventors: Hyungsuk Kim, Suwon-si (KR); Sungyeol Kim, Suwon-si (KR); Taeyeon Kim, Suwon-si (KR); Kyehoon Lee, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/126,163

(22) Filed: Mar. 24, 2023

(65) Prior Publication Data

US 2023/0389160 A1    Nov. 30, 2023

Related U.S. Application Data

(63) Continuation of application No. PCT/KR2023/003066, filed on Mar. 7, 2023.

(30) Foreign Application Priority Data

May 24, 2022  (KR) .................... 10-2022-0063704

(51) Int. Cl.
  *G02F 1/1335*   (2006.01)
  *G02F 1/13357*  (2006.01)
  *H05B 45/56*    (2020.01)

(52) U.S. Cl.
  CPC ....... *H05B 45/56* (2020.01); *G02F 1/133603* (2013.01); *G02F 1/133612* (2021.01)

(58) Field of Classification Search
  CPC .... H05B 45/56; H05B 45/28; G02F 1/133603
  (Continued)

(56) References Cited

U.S. PATENT DOCUMENTS 6,447,146 B1   9/2002   Skinner et al.
9,159,272 B2  10/2015   Murai et al.
(Continued)

FOREIGN PATENT DOCUMENTS

CN    113674705 A   11/2021
JP   2021135320 A    9/2021
(Continued)

OTHER PUBLICATIONS

International Search Report (PCT/ISA/210) issued on Jun. 26, 2023 by the International Searching Authority in International Patent Application No. PCT/KR2023/003066.
(Continued)

*Primary Examiner* — Calvin C Ma
(74) *Attorney, Agent, or Firm* — Sughrue Mion, PLLC

(57) ABSTRACT

A display apparatus is provided. The display apparatus includes: a backlight unit including a substrate and light sources configured to emit light to a liquid crystal panel; and a processor configured to: identify a plurality of dimming blocks, each of which includes at least one light source among the plurality of light sources; predict a temperature for each of the plurality of dimming blocks based on a dimming signal corresponding to an input image and current-specific temperature profile information corresponding to the plurality of dimming blocks; update the dimming signal based on the temperature predicted for each of the plurality of dimming blocks; and control a supply current for each of the plurality of dimming blocks based on the dimming signal.

20 Claims, 20 Drawing Sheets

(58) Field of Classification Search
USPC .......................................................... 345/102
See application file for complete search history.

(56) References Cited

U.S. PATENT DOCUMENTS

| | | | |
|---|---|---|---|
| 9,232,135 B2 | 1/2016 | Kim et al. | |
| 9,618,758 B2 | 4/2017 | Park et al. | |
| 10,950,189 B2 | 3/2021 | Park | |
| 10,977,993 B2 | 4/2021 | Jang et al. | |
| 11,727,875 B2 | 8/2023 | Park et al. | |
| 2013/0127699 A1* | 5/2013 | Atkinson | G09G 3/3406 345/101 |
| 2015/0116379 A1* | 4/2015 | Lim | G09G 3/342 345/691 |
| 2019/0307350 A1* | 10/2019 | Sridhar | A61B 5/4088 |
| 2021/0364861 A1* | 11/2021 | Lum | H05B 47/105 |

FOREIGN PATENT DOCUMENTS

| | | |
|---|---|---|
| KR | 10-2009-0041029 A | 4/2009 |
| KR | 10-2012-0120310 A | 11/2012 |
| KR | 10-1681779 B1 | 12/2016 |
| KR | 10-2078093 B1 | 2/2020 |
| KR | 10-2020-0068321 A | 6/2020 |
| KR | 10-2020-0070061 A | 6/2020 |
| KR | 10-2250585 B1 | 5/2021 |
| KR | 10-2021-0142964 A | 11/2021 |
| KR | 10-2022-0090191 A | 6/2022 |

OTHER PUBLICATIONS

Written Opinion (PCT/ISA/237) issued on Jun. 26, 2023 by the International Searching Authority in International Patent Application No. PCT/KR2023/003066.

* cited by examiner

FIG. 14

| CONTROL CONDITION | CONTROL CONTENT |
|---|---|
| AVERAGE CUMULATIVE CURRENT > REFERENCE CURRENT | UPDATE DIMMING SIGNAL TO DECREASE SUPPLY CURRENT |
| AVERAGE CUMULATIVE CURRENT < REFERENCE CURRENT | UPDATE DIMMING SIGNAL TO INCREASE SUPPLY CURRENT |

DISPLAY APPARATUS AND METHOD OF CONTROLLING THE SAME

CROSS-REFERENCE TO RELATED APPLICATION(S)

This application is a bypass continuation application of International Application No. PCT/KR2023/003066, filed on Mar. 7, 2023, which claims priority to Korean Patent Application No. 10-2022-0063704, filed on May 24, 2022, in the Korean Intellectual Property Office, the disclosures of which are incorporated by reference herein in their entireties.

BACKGROUND

1. Field

The disclosure relates to a display apparatus including a liquid crystal panel and a backlight unit (BLU).

2. Description of Related Art

Generally, a display apparatus converts obtained or stored electrical information into visual information and displays the visual information to a user. Display apparatuses are used in various fields, such as home or workplace.

The display apparatus includes a monitor apparatus connected to a personal computer (PC) or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

Some display apparatuses include a backlight unit for providing light to a liquid crystal panel, and the backlight unit may include a plurality of point light sources configured to independently emit light. Each light source may include a light emitting diode (LED) or an organic light emitting diode (OLED).

In addition, the display apparatus may perform local dimming to vary the brightness of light for each region of the backlight unit in association with an output image to improve power consumption while increasing the contrast ratio.

However, when local dimming is performed, driving at a peak current on some regions may cause temperature to rise, which may result in damage to the display apparatus or inefficiency of power.

SUMMARY

Provided is a display apparatus that may, based on a dimming signal for each of dimming blocks determined in image data and current-specific temperature profile information of the dimming blocks, predict a temperature of each dimming block for output of an image and adjust a current supplied to the dimming block based on the predicted temperature when outputting an image.

Additional aspects will be set forth in part in the description which follows and, in part, will be apparent from the description, or may be learned by practice of presented embodiments.

In accordance with an aspect of the disclosure, a display apparatus includes: a liquid crystal panel; a backlight unit including a plurality of light sources provided on an upper surface of a substrate and configured to emit light to the liquid crystal panel; and at least one processor configured to: identify a plurality of dimming blocks, each of which includes at least one light source among the plurality of light sources; predict a temperature for each of the plurality of dimming blocks based on a dimming signal corresponding to an input image and current-specific temperature profile information corresponding to the plurality of dimming blocks; update the dimming signal based on the temperature predicted for each of the plurality of dimming blocks; and control a supply current for each of the plurality of dimming blocks based on the dimming signal.

The plurality of dimming blocks may include a first dimming block and a second dimming block. The dimming signal may include a first dimming signal corresponding to the first dimming block and a second dimming signal corresponding to the second dimming block. The at least one processor may be further configured to: update the first dimming signal to reduce a first supply current of the first dimming block based on a first predicted temperature for the first dimming block being higher than or equal to a preset value; and update the second dimming signal to increase a second supply current of the second dimming block based on a second predicted temperature for the second dimming block being lower than the preset value.

The at least one processor may be further configured to identify a weight of each of the plurality of dimming blocks based on the temperature predicted for each of the plurality of dimming blocks.

The at least one processor may be further configured to: identify an average cumulative current for each of the plurality of dimming blocks; and update the dimming signal to control the supply current for each of the plurality of dimming blocks based on a comparison of a preset reference current and the average cumulative current adjusted by the weight.

The at least one processor may be further configured to, based on the average cumulative current adjusted by the weight for a third dimming block, among the plurality of dimming blocks, being greater than or equal to the preset reference current, update the dimming signal to decrease a current supplied to the third dimming block.

The at least one processor may be further configured to, based on the average cumulative current adjusted by the weight for a third dimming block, among the plurality of dimming blocks, being less than the preset reference current, update the dimming signal to increase a current supplied to the third dimming block.

The at least one processor may be further configured to: identify the weight of the first dimming block to increase the average cumulative current for the first dimming block; and identify the weight of the second dimming block to decrease the average cumulative current for the second dimming block.

The at least one processor may be further configured to: divide the plurality of dimming blocks into a plurality of groups; and identify a weight that is shared by the plurality of dimming blocks provided in a first group of the plurality of groups based on a predicted temperature of a center dimming block in the first group.

The at least one processor may be further configured to identify an average cumulative current of the center dimming block in the first group, and based on the weight and the average cumulative current of the center dimming block, update the dimming signal to control each of the plurality of dimming blocks provided in the first group.

The at least one processor may be further configured to obtain the current-specific temperature profile information by measuring a temperature change in a dimming block at a plurality of different current values over time during a first period from a first point in time at which supply of a current to the dimming block is started to a second point in time at which the supply of the current to the dimming block is interrupted, and a second period from the second point in time to a third point in time.

The at least one processor may be further configured to predict the temperature of each of the plurality of dimming blocks based on an output of a neural network that uses the dimming signal corresponding to the input image and the current-specific temperature profile information of the plurality of dimming blocks as input data.

In accordance with an aspect of the disclosure, a method of controlling a display apparatus including a liquid crystal panel, and a backlight unit including a plurality of light sources configured to emit light to the liquid crystal panel, includes: identifying a plurality of dimming blocks, each of which includes at least one light source among the plurality of light sources; predicting a temperature for each of the plurality of dimming blocks based on a dimming signal corresponding to an input image and current-specific temperature profile information corresponding to the plurality of dimming blocks; updating the dimming signal based on the temperature predicted for each of the plurality of dimming blocks; and controlling a supply current for each of the plurality of dimming blocks based on the dimming signal.

The plurality of dimming blocks may include a first dimming block and a second dimming block. The dimming signal may include a first dimming signal corresponding to the first dimming block and a second dimming signal corresponding to the second dimming block. The updating the dimming signal may include: updating the first dimming signal to reduce a first supply current of the first dimming block based on a first predicted temperature for the first dimming block being higher than or equal to a preset value; and updating the second dimming signal to increase a second supply current of the second dimming block based on a second predicted temperature for the second dimming block being lower than the preset value.

The updating the dimming signal may include: identifying a weight of each of the plurality of dimming blocks based on the temperature predicted for each of the plurality of dimming blocks; identifying an average cumulative current for each of the plurality of dimming blocks when outputting the input image; and updating the dimming signal to control the supply current for each of the plurality of dimming blocks based on a comparison of a preset reference current and the average cumulative current adjusted by the weight.

The updating the dimming signal may include, based on the average cumulative current adjusted by the weight for a third dimming block, among the plurality of dimming blocks, being greater than or equal to the preset reference current, updating the dimming signal to decrease a current supplied to the third dimming block.

The updating the dimming signal may include, based on the average cumulative current adjusted by the weight for a third dimming block, among the plurality of dimming blocks, being less than the preset reference current, updating the dimming signal to increase a current supplied to the third dimming block.

The updating the dimming signal may include: identifying the weight of the first dimming block to decrease the average cumulative current for the first dimming block; and identifying the weight of the second dimming block to decrease the average cumulative current for the second dimming block.

The updating the dimming signal may include: dividing the plurality of dimming blocks into a plurality of groups; identifying a weight that is shared by the plurality of dimming blocks provided in a first group of the plurality of groups based on a predicted temperature of a center dimming block in the first group; identifying an average cumulative current of the center dimming block in the first group; and updating the dimming signal to control each of the plurality of dimming blocks provided in the first group based on the weight and the average cumulative current of the center dimming block.

The current-specific temperature profile information may include information obtained by measuring a temperature change in a dimming block at a plurality of different current values over time during a first period from a first point in time at which supply of a current to the dimming block is started to a second point in time at which the supply of the current to the dimming block is interrupted, and a second period from the second point in time to a third point in time.

The predicting the temperature for each of the plurality of dimming blocks may include providing is performed based on an output of a neural network that uses the dimming signal corresponding to the input image and the current-specific temperature profile information of the plurality of dimming blocks as input data.

In accordance with an aspect of the disclosure, a non-transitory computer readable recording medium having embodied thereon a program, which when executed by a processor of a display device that includes a plurality of light sources configured to emit light to a liquid crystal panel, causes the display device to execute a method including: identifying a plurality of dimming blocks, each of which includes at least one light source among the plurality of light sources; predicting a temperature for each of the plurality of dimming blocks based on a dimming signal corresponding to an input image and current-specific temperature profile information corresponding to the plurality of dimming blocks; updating the dimming signal based on the temperature predicted for each of the plurality of dimming blocks; and controlling a supply current for each of the plurality of dimming blocks based on the dimming signal.

In accordance with an aspect of the disclosure, a backlight unit includes: a plurality of light sources configured to emit light, the plurality of light sources being grouped into a plurality of dimming blocks; and at least one processor configured to: predict a first temperature for a first dimming block, among the plurality of dimming blocks, based on an input image and temperature profile information of the plurality of dimming blocks; and control a first supply current for the first dimming block based on the first temperature and the input image.

The at least one processor may be further configured to: predict a second temperature for a second dimming block, among the plurality of dimming blocks, based on the input image and the temperature profile information; and control a second supply current for the second dimming block based on the second temperature and the input image.

The at least one processor may be further configured to concurrently control the first supply current to increase first luminance of the first dimming block and control the second supply current to decrease second luminance of the second dimming block.

The at least one processor may be further configured to concurrently control the first supply current to increase first luminance of the first dimming block and control the second supply current to decrease second luminance of the second dimming block, based on identifying the first temperature is greater than a preset value and the second temperature is less than the preset value.

BRIEF DESCRIPTION OF DRAWINGS

These and other aspects, features and advantages of certain embodiments of the present disclosure will be more apparent from the following description, taken in conjunction with the accompanying drawings, in which:

FIG. 14 is a diagram for describing a display apparatus which adjusts a dimming signal according to an embodiment;

DETAILED DESCRIPTION

Figure 1:
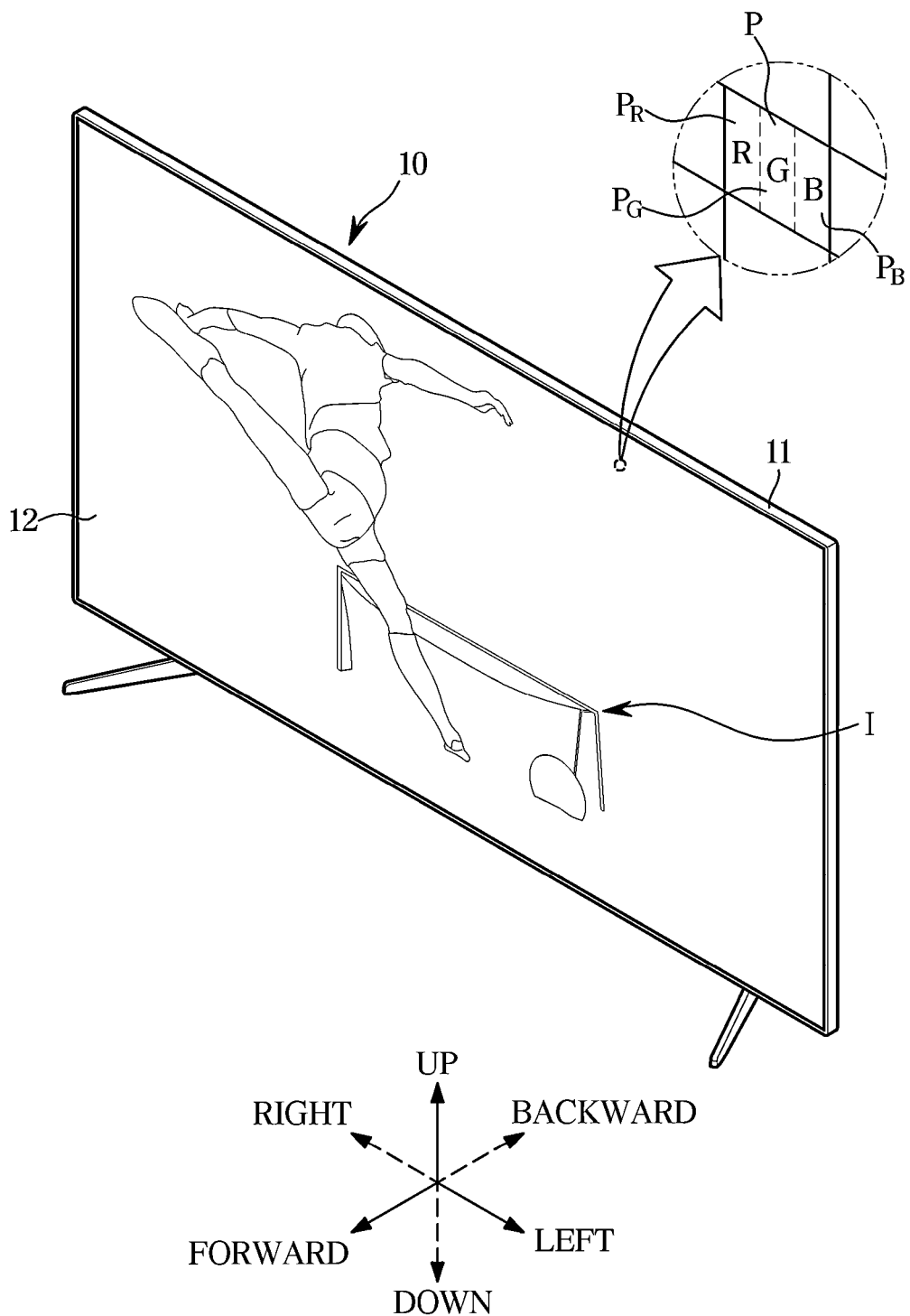
FIG. 1 illustrates an example of an appearance of a display apparatus according to an embodiment.

Embodiments described herein and configurations shown in the drawings are provided as examples, and various modifications may be made without departing from the scope of the present disclosure.

It will be further understood that the term "connect" or its derivatives refer both to direct and indirect connection, and the indirect connection includes a connection over a wireless communication network.

The terms used herein are for the purpose of describing embodiments and are not intended to restrict and/or to limit the present disclosure. For example, singular expressions herein may include plural expressions, unless the context clearly dictates otherwise. In addition, the terms "includes," "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

As used herein, the terms "1st" or "first" and "2nd" or "second" may use corresponding components regardless of importance or order and are used to distinguish a component from another without limiting the components. For example, without departing from the scope of the present disclosure, the first component may be referred to as a second component, and similarly, the second component may in addition be referred to as a first component. As used herein, expressions such as "at least one from among," when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method operations are used for convenience of explanation, but not to limit an order of the operations. Thus, unless the context clearly dictates otherwise, the written order may be practiced otherwise.

Hereinafter embodiments according to the present disclosure will be described in detail with reference to the accompanying drawings.

FIG. 1 illustrates an example of an appearance of a display apparatus according to an embodiment.

Referring to FIG. 1, a display apparatus 10 is a device that processes an image signal, which may be received from an external device or generated internally, and visually displays the processed image. Hereinafter the display apparatus 10 is described as a television, but the disclosure is not limited thereto. For example, the display apparatus 10 may be implemented in various forms, such as a monitor, a portable multimedia device, and a portable communication device, and the display apparatus 10 is not limited in its shape.

In addition, the display apparatus 10 may be a large format display (LFD) installed outdoors, such as a roof of a building, a bus stop or other outdoor location. The LFD may also be installed indoors, such as in subway stations, shopping malls, movie theaters, companies, stores or other indoor locations.

The display apparatus 10 may receive content including a video signal and an audio signal from various content sources and output video and audio corresponding to the video signal and the audio signal. For example, the display apparatus 10 may receive content data through a broadcast reception antenna or cable, receive content data from a content playback device, or receive content data from a content providing server of a content provider.

As illustrated in FIG. 1, the display apparatus 10 includes a body 11, and a screen 12 provided to display an image I.

The body 11 may form an appearance of the display apparatus 10, and the body 11 may include a component configured to allow the display apparatus 10 to display the image I and to perform various functions. Although the body 11 shown in FIG. 1 is in the form of a flat plate, the shape of the body 11 is not limited thereto. For example, the body 11 may have a curved plate shape.

The screen 12 may be formed on a front surface of the body 11, and be configured to display the image I. For example, the screen 12 may display a still image or a moving image. Further, the screen 12 may display a two-dimensional plane image or a three-dimensional image using binocular parallax of the user.

The screen 12 may include a liquid crystal panel for selectively passing or blocking light emitted by a backlight unit (BLU) (e.g., a backlight) or the like.

The screen 12 may include a self-emissive display (for example, a light emitting diode panel or an organic light emitting diode panel) configured to emit light directly or a non-emissive display (for example, a liquid crystal panel) configured to transmit or block light emitted from a light source apparatus (for example, a backlight unit).

A plurality of pixels P may be formed on the screen 12 and the image I displayed on the screen 12 may be formed by a combination of the light emitted from the plurality of pixels P. For example, the image I may be formed on the screen 12 by combining light emitted from the plurality of pixels P as a mosaic.

Each of the plurality of pixels P may emit a different brightness and a different color of light. In order to emit light in the various colors, the plurality of pixels P may include sub-pixels PR, PG, and PB, respectively.

The sub-pixels PR, PG, and PB may include a red sub pixel PR configured to emit red light, a green sub pixel PG configured to emit green light, and a blue sub pixel PB configured to emit blue light. For example, the red light may represent a light beam having a wavelength of approximately 700 nm (nanometers, one billionth of a meter) to 800 nm, the green light may represent a light beam having a wavelength of approximately 500 nm to 600 nm, and the blue light may represent a light beam having a wavelength of approximately 400 nm to 500 nm.

By combining the red light of the red sub pixel PR, the green light of the green sub pixel PG and the blue light of the blue sub pixel PB, each of the plurality of pixels P may emit a different brightness and a different color of light.

Figure 2:
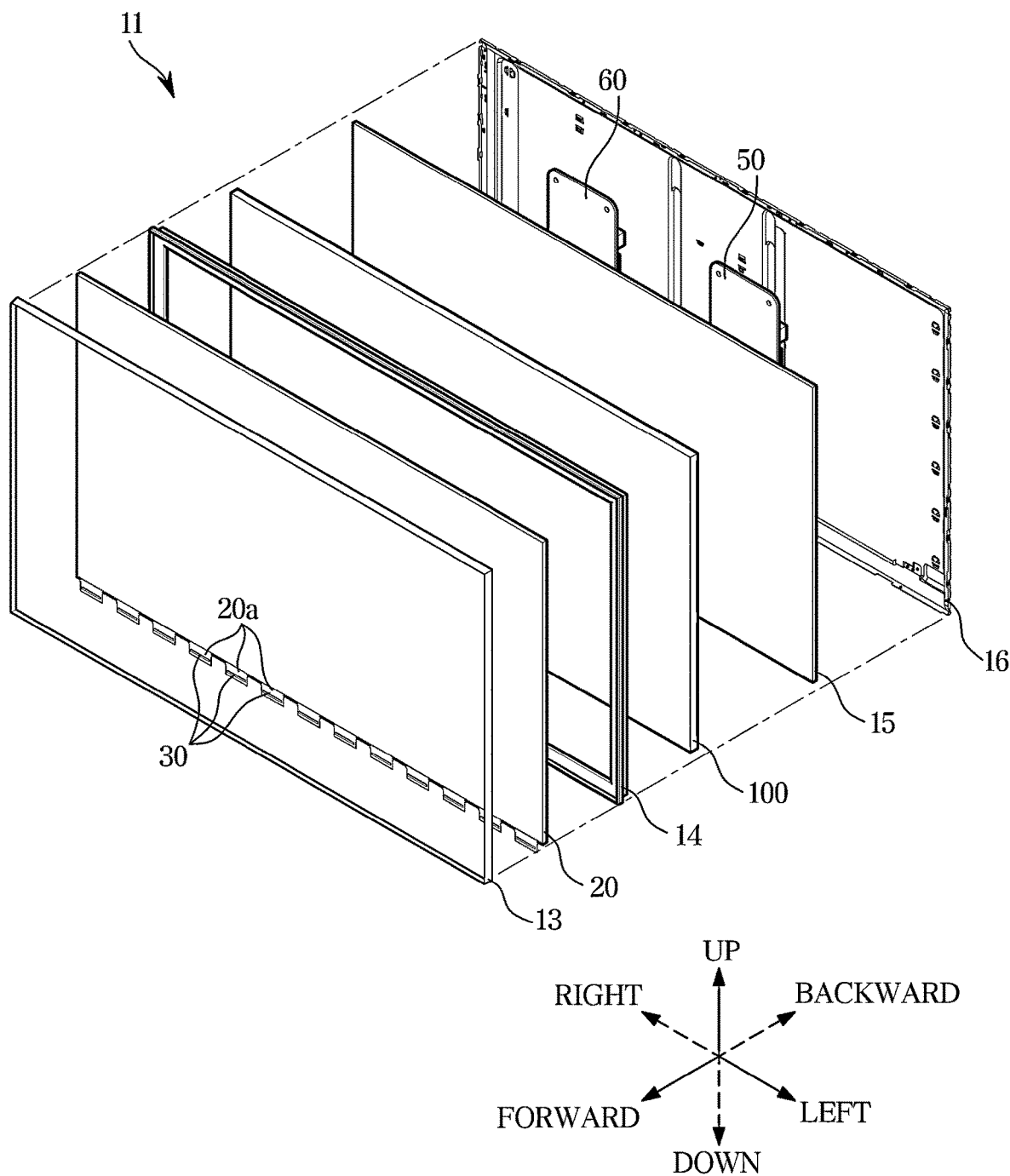
FIG. 2 illustrates an example of a structure of the display apparatus according to an embodiment.
Figure 3:
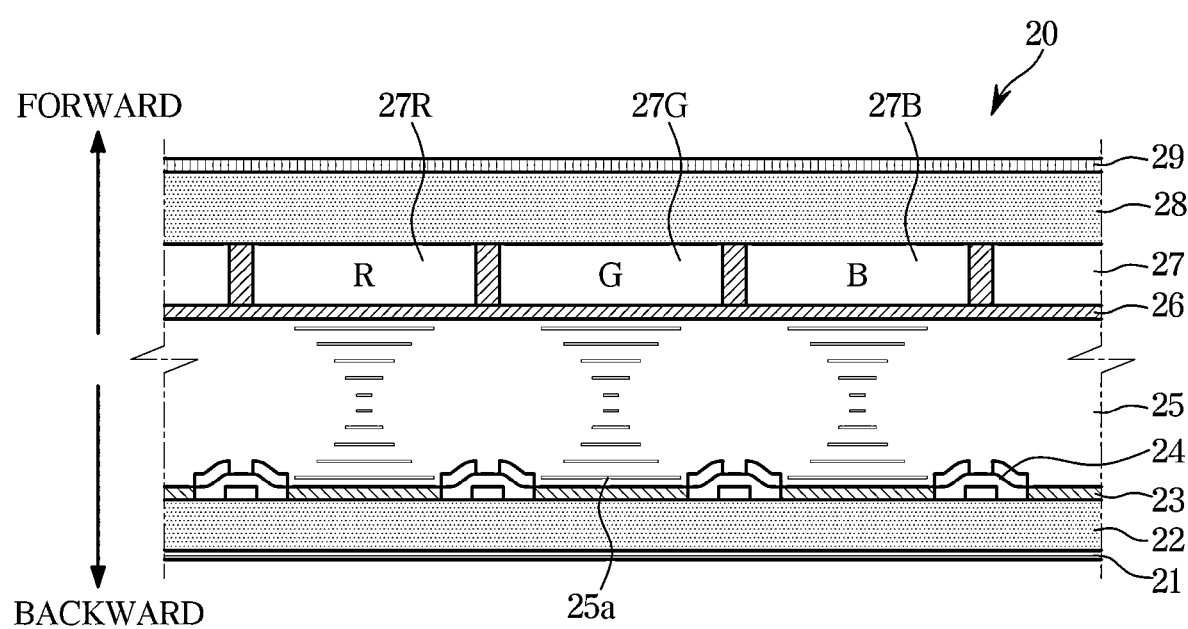
FIG. 3 illustrates an example of a liquid crystal panel included in the display apparatus according to an embodiment.

FIG. 2 illustrates an example of a structure of the display apparatus 10 according to an embodiment. FIG. 3 illustrates an example of a liquid crystal panel included in the display apparatus 10 according to an embodiment.

As shown in FIG. 2, various components configured to generate the image I on the screen S may be provided inside the body 11.

For example, the body 11 may include a backlight unit 100 that is a surface light source, a liquid crystal panel 20 configured to block or transmit light emitted from the backlight unit 100, a control assembly 50 configured to control an operation of the backlight unit 100 and the liquid crystal panel 20, and a power assembly 60 configured to supply power to the backlight unit 100 and the liquid crystal panel 20. Further, the body 11 may include a bezel 13, a frame middle mold 14, a bottom chassis 15 and a rear cover 16 which are provided to support the liquid crystal panel 20, the backlight unit 100, the control assembly 50 and the power assembly 60.

The backlight unit 100 may include a point light source configured to emit light, for example, white light. The backlight unit 100 may refract, reflect, and scatter light emitted from the point light source so as to convert the light emitted from the point light source to surface light. As described above, the backlight unit 100 may refract, reflect, and scatter light emitted from the point light source, thereby emitting uniform surface light toward the liquid crystal panel 20.

A configuration of the backlight unit 100 will be described in more detail below.

The liquid crystal panel 20 is provided in front of the backlight unit 100 and selectively blocks or transmits light emitted from the backlight unit 100 to form the image I.

A front surface of the liquid crystal panel 20 may form the screen S of the display apparatus 10 described above, and the liquid crystal panel 20 may form the plurality of pixels P. In the liquid crystal panel 20, the plurality of pixels P may independently block or transmit light from the backlight unit 100. The light transmitted through the plurality of pixels P may form the image I displayed on the screen S.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 are provided on the outside of the first and second transparent substrates 22 and 28. Each of the first polarizing film 21 and the second polarizing film 29 may transmit a specific light beam and block (reflect or absorb) other light beams. For example, the first polarizing film 21 may transmit a light beam in a first direction and block (reflect or absorb) other light beams. In addition, the second polarizing film 29 may transmit a light beam in a second direction and block (reflect or absorb) other light beams. In this case, the first direction and the second direction may be perpendicular to each other. Therefore, the polarized light passing through the first polarizing film 21 may not directly pass through the second polarizing film 29.

The color filter 27 may be provided inside the second transparent substrate 28. The color filter 27 may include a red filter 27R which transmits red light, a green filter 27G which transmits green light, and a blue filter 27B which transmits blue light. The red filter 27R, the green filter 27G, and the blue filter 27B may be disposed parallel to each other. A region, which is occupied by the color filter 27 corresponds to the pixel P described above. A region, which is occupied by the red filter 27R, corresponds to the red sub-pixel PR, a region, which is occupied by the green filter 27G, corresponds to the green sub-pixel PG, and a region, in which the blue filter 27B is formed, corresponds to the blue sub-pixel PB.

The pixel electrode 23 may be provided inside the first transparent substrate 22, and the common electrode 26 may be provided inside the second transparent substrate 28. The pixel electrode 23 and the common electrode 26 may be formed of a metal material through which electricity may be conducted, and the pixel electrode 23 and the common electrode 26 may generate an electric field to change the arrangement of liquid crystal molecules 25a forming the liquid crystal layer 25 to be described below.

The thin film transistor (TFT) 24 is provided inside the second transparent substrate 22. The TFT 24 may be turned on (closed) or turned off (opened) according to image data provided from the panel driver 30. In addition, an electric field may be formed or removed between the pixel electrode 23 and the common electrode 26 in response to turning on (closing) or turning off (opening) the TFT 24.

The liquid crystal layer 25 is formed between the pixel electrode 23 and the common electrode 26, and the liquid crystal layer 25 is filled with the liquid crystal molecules 25a. Liquid crystals represent an intermediate state between a solid (crystal) and a liquid. Liquid crystals in addition exhibit optical properties according to changes in an electric field. For example, in the liquid crystal, the orientation of molecules forming the liquid crystal may change according to a change in an electric field. As a result, the optical properties of the liquid crystal layer 25 may vary depending on the presence or absence of the electric field passing through the liquid crystal layer 25. For example, the liquid crystal layer 25 may allow the polarization direction of light to be rotated about an optical axis depending on whether an electric field is present or absent. As a result, the polarization light passing through the first polarizing film 21 may have a polarization direction rotated while passing through the liquid crystal layer 25, and pass through the second polarization film 29.

A cable 20a configured to transmit image data to the liquid crystal panel 20, and a display driver integrated circuit (DDI) (hereinafter referred to as 'panel driver') 30 configured to process digital image data and output an analog image signal are provided at one side of the liquid crystal panel 20.

The cable 20a may electrically connect the control assembly to the panel driver 30, the power assembly 60 to the panel driver 30 and the panel driver 30 to the liquid crystal panel 20. The cable 20a may include a flexible flat cable or a film cable that is bendable.

The panel driver 30 may receive image data and power from the control assembly 50 and the power assembly 60 through the cable 20a. The panel driver 30 may transmit the image data and driving current to the liquid crystal panel 20 through the cable 20a.

In addition, the cable 20a and the panel driver 30 may be integrally implemented as a film cable, a chip on film (COF), or a tape carrier package (TCP). In some embodiments, the panel driver 30 may be disposed on the cable 20a. However, the disclosure is not limited thereto, and the panel driver 30 may be disposed on the liquid crystal panel 20.

The control assembly 50 may include a control circuit configured to control an operation of the liquid crystal panel 20 and the backlight unit 100. For example, the control circuit may process a video signal and/or audio signal from an external content source. The control circuit may transmit image data to the liquid crystal panel 20, and transmit dimming data to the backlight unit 100.

The power assembly 60 may include a power circuit configured to supply power to the liquid crystal panel 20 and the backlight unit 100. The power circuit may supply power to the control assembly 50, the backlight unit 100, and the liquid crystal panel 20.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Figure 4:
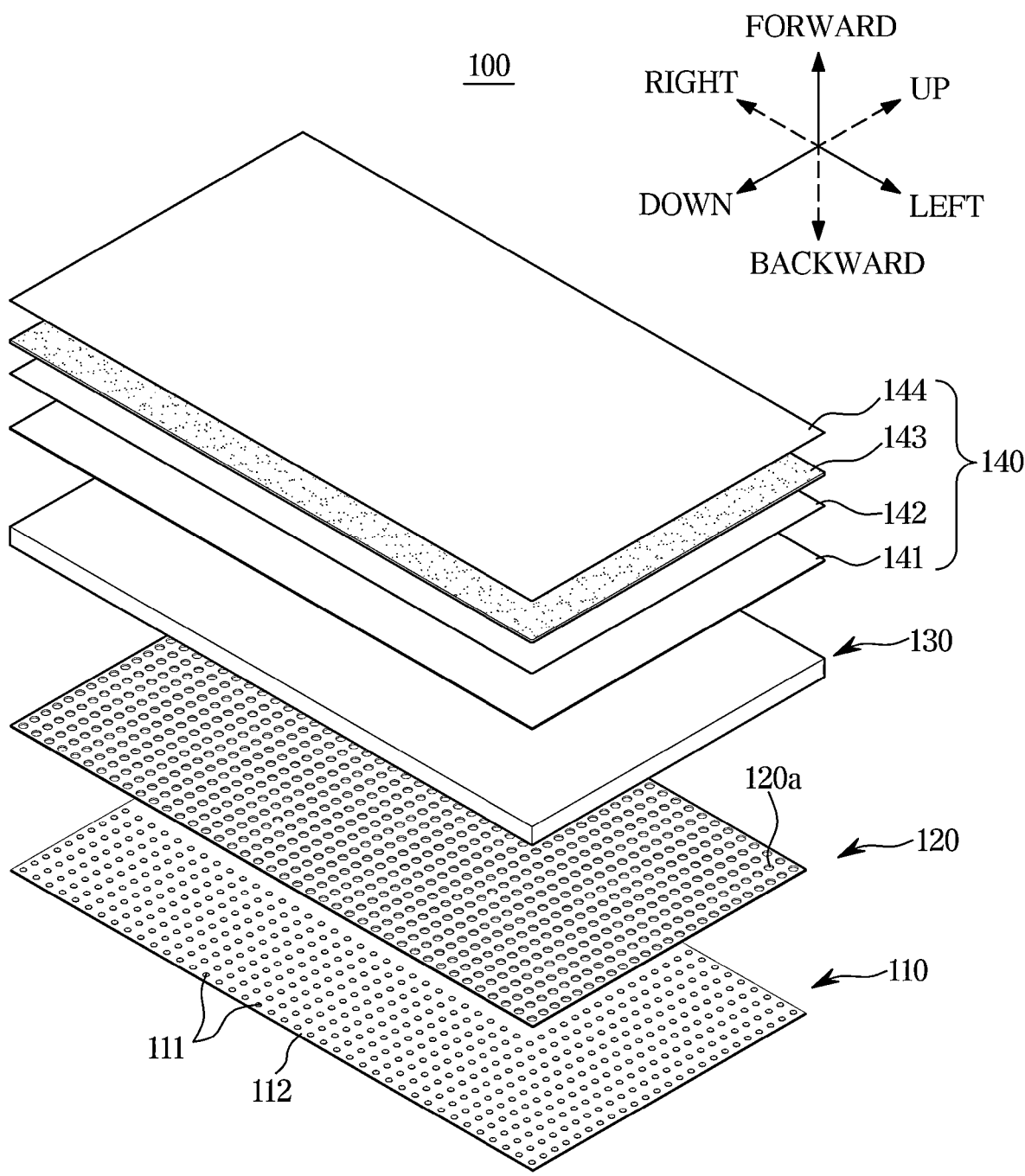
FIG. 4 illustrates an example of a backlight unit included in the display apparatus according to an embodiment.
Figure 5:
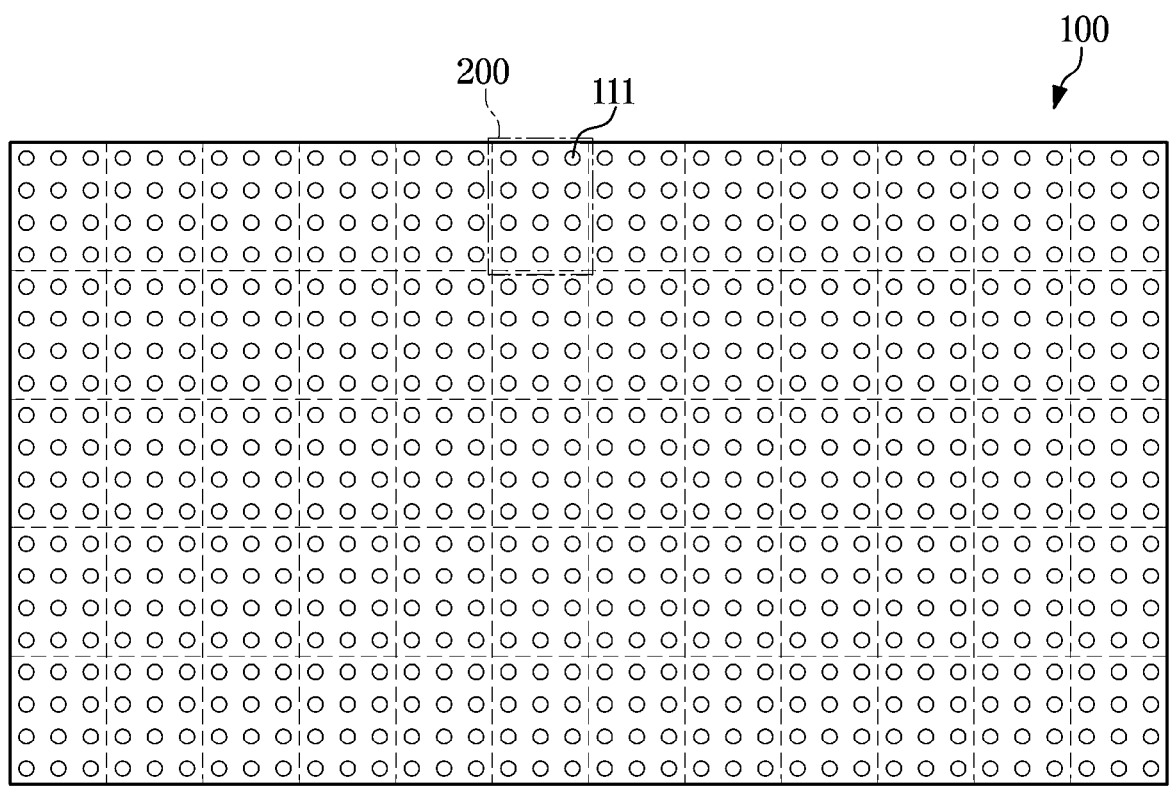
FIG. 5 is a diagram for describing a plurality of light emitting diodes of a backlight unit that are divided into dimming blocks according to an embodiment.

FIG. 4 illustrates an example of a backlight unit 100 included in the display apparatus 10 according to an embodiment and FIG. 5 is a diagram for describing a plurality of light emitting diodes (LEDs) of a backlight unit 100 that are divided into dimming blocks according to an embodiment.

As illustrated in FIG. 4, the backlight unit 100 may include a light source module 110 configured to generate light, a reflective sheet 120 configured to reflect light, a diffuser plate 130 configured to uniformly diffuse light, and an optical sheet 140 configured to improve a luminance of light that is emitted.

The light source module 110 may include a plurality of light sources 111 configured to emit light, and a substrate 112 provided to support/fix the plurality of light sources 111.

The plurality of light sources 111 may be disposed in a predetermined pattern to allow light to be emitted with uniform luminance. The plurality of light sources 111 may be disposed in such a way that a distance between one light source and light sources adjacent thereto is the same.

For example, as shown in FIG. 4, the plurality of light sources 111 may be arranged in rows and columns. Accordingly, the plurality of light sources may be disposed such that an approximately square is formed by four adjacent light sources. In addition, any one light source may be disposed adjacent to four light sources, and a distance between one light source and four adjacent light sources may be approximately the same.

Alternatively, according to embodiments, the plurality of light sources may be disposed such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the patterns described above, and the plurality of light sources 111 may be disposed in various patterns to allow light to be emitted with uniform luminance.

The light source 111 may include an element configured to emit monochromatic light (i.e., light of a specific wavelength, for example, blue light) or white light (for example light of a mixture of red light, green light, and blue light) in various directions by receiving power. For example, the plurality of light sources 111 may each include a light emitting diode (LED). The LEDs may be implemented in various sizes, and may include, for example, Mini LEDs and/or Micro LEDs.

The substrate 112 may fix the plurality of light sources 111 to prevent a change in the position of the light source 111. Further, the substrate 112 may supply power, which is used by the light source 111 to emit light, to the light source 111.

The substrate 112 may fix the plurality of light sources 111, and may include synthetic resin and/or tempered glass and/or a printed circuit board (PCB) on which a conductive power supply line for supplying power to the light source 111 is formed.

The reflective sheet 120 may reflect light emitted from the plurality of light sources 111 to a front side or to a direction close to the front side.

In the reflective sheet 120, a plurality of through holes 120*a* is formed at positions corresponding to each of the plurality of light sources 111 of the light source module 110. In addition, the light source 111 of the light source module 110 may extend into the through hole 120*a*, and may pass through the through hole 120*a* and protrude to the front of the reflective sheet 120.

For example, during a process of assembling the reflective sheet 120 and the light source module 110, the plurality of light sources 111 of the light source module 110 may be inserted into the plurality of through holes 120*a* formed in the reflective sheet 120. Accordingly, the substrate 112 of the light source module 110 may be positioned behind the reflective sheet 120, and the plurality of light sources 111 of the light source module 110 may extend through the through holes 120*a* and be at least partially positioned in front of the reflective sheet 120.

Accordingly, the plurality of light sources 111 may emit light from the front of the reflective sheet 120.

The plurality of light sources 111 may emit light in various directions from the front of the reflective sheet 120. Light may not only be emitted from the light source 111 toward the diffuser plate 130, but also may be emitted from the light source 111 toward the reflective sheet 120, and the reflective sheet 120 may allow light emitted toward the reflective sheet 120 to be reflected toward the diffuser plate 130.

Light emitted from the light source 111 passes through various objects, such as the diffuser plate 130 and the optical sheet 140. When light passes through the diffuser plate 130 and the optical sheet 140, some of the incident light is reflected from the surfaces of the diffuser plate 130 and the optical sheet 140. The reflective sheet 120 may reflect the light reflected by the diffuser plate 130 and the optical sheet 140.

The diffuser plate 130 may be provided in front of the light source module 110 and the reflective sheet 120, and may evenly distribute the light emitted from the light source 111 of the light source module 110.

As described above, the plurality of light sources 111 are located at various positions on the rear surface of the backlight unit 100. Although the plurality of light sources 111 are disposed at equal intervals on the rear surface of the backlight unit 100, unevenness in luminance may occur depending on the positions of the plurality of light sources 111.

The diffuser plate 130 may allow light emitted from the plurality of light sources 111 to be diffused inside the diffuser plate 130 to remove unevenness in luminance caused by the plurality of light sources 111. In this regard, the diffuser plate 130 may uniformly emit uneven light of the plurality of light sources 111 to the front surface.

The optical sheet 140 may include various sheets for improving luminance and luminance uniformity. For example, the optical sheet 140 may include a diffusion sheet 141, a first prism sheet 142, a second prism sheet 143, and a reflective polarizing sheet 144.

The diffusion sheet 141 diffuses light to improve uniformity of luminance. Light emitted from the light source 111 may be diffused by the diffuser plate 130 and diffused again by the diffusion sheet 141 included in the optical sheet 140.

The first and second prism sheets 142 and 143 may increase luminance by condensing the light diffused by the diffusion sheet 141. The first and second prism sheets 142 and 143 include a prism pattern having a triangular prism shape, and a plurality of the prism patterns are arranged adjacent to each other, forming a plurality of band shapes.

The reflective polarizing sheet 144 is a type of polarizing film and may transmit some of the incident light and reflect another some to improve luminance. For example, light polarized in the same direction as a predetermined polarization direction of the reflective polarizing sheet 144 may be transmitted, and light polarized in a direction different from that of the reflective polarizing sheet 144 may be reflected. In addition, the light reflected by the reflective polarizing sheet 144 may be recycled inside the backlight unit 100, and such a light recycling may allow the luminance of the display apparatus 10 to be improved.

The sheet of film included in the optical sheet 140 is not limited to the sheet or film shown in FIG. 4, and the optical sheet 140 may include more various sheets, such as a protective sheet, or films.

The backlight unit 100 may include a plurality of light sources 111 and may diffuse light emitted from the plurality of light sources 111, thereby outputting surface light. The liquid crystal panel 20 may include a plurality of pixels, and may control the plurality of pixels to allow the plurality of pixels to transmit or block light. An image may be formed by light that passes through each of the plurality of pixels.

In this case, in order to improve power consumption while increasing the contrast ratio, the display apparatus 10 may perform local dimming to vary the brightness of light for each region of the backlight unit 100 in association with the output image.

For example, in order to darken a dark area of an image, the display apparatus 10 may decrease the brightness of light from the light source 111 of the backlight unit 100 corresponding to the dark area of the image, and in order to brighten a bright area of an image, may increase the brightness of light from the light source 111 of the backlight unit 100 corresponding to the bright area of the image. Accordingly, the contrast ratio of an image may be improved.

The display apparatus 10 may divide the backlight unit 100 into a plurality of blocks, and independently control a current for each block according to an input image. Image transmission of the display apparatus 10 may be achieved by performing local dimming driving for each frame, and driving of a current is adjusted according to the number of blocks into which light sources 111 are divided in the backlight unit 100.

As a result, the display apparatus 10 may decrease a current supplied to a dimming block in a dark area of an input image and increase a current supplied to a dimming block in a bright area of the input image so that the contrast ratio may be effectively improved.

For local dimming, the plurality of light sources 111 included in the backlight unit 100 may be divided into a plurality of dimming blocks 200. For example, as shown in FIG. 5, the plurality of dimming blocks 200 may include a total of 60 dimming blocks 200, arranged in five rows and twelve columns. However, the number of dimming blocks 200 and arrangement thereof is not limited to those shown in FIG. 5.

Referring to FIG. 5, each of the plurality of dimming blocks 200 may include at least one light source 111. The backlight unit 100 may supply the same driving current to light sources 111 belonging to the same dimming block 200, and the light sources 111 belonging to the same dimming block 200 may emit light of the same brightness.

In addition, the backlight unit 100 may supply different drive currents to light sources 111 belonging to different dimming blocks 200 according to dimming data, and the light sources 111 belonging to the different dimming blocks 200 may emit light of different brightness.

Each of the plurality of dimming blocks 200 may include, for example, N×M light sources arranged in an N×M matrix form (N and M are natural numbers). An N×M matrix refers to a matrix with N rows and M columns.

Because each of the light sources 111 includes a LED, each of the plurality of dimming blocks 200 may include N×M LEDs.

The plurality of dimming blocks 200 may be disposed on the substrate 112. That is, N×M LEDs may be disposed on the substrate 112.

Local dimming will be described in more detail below.

Figure 6:
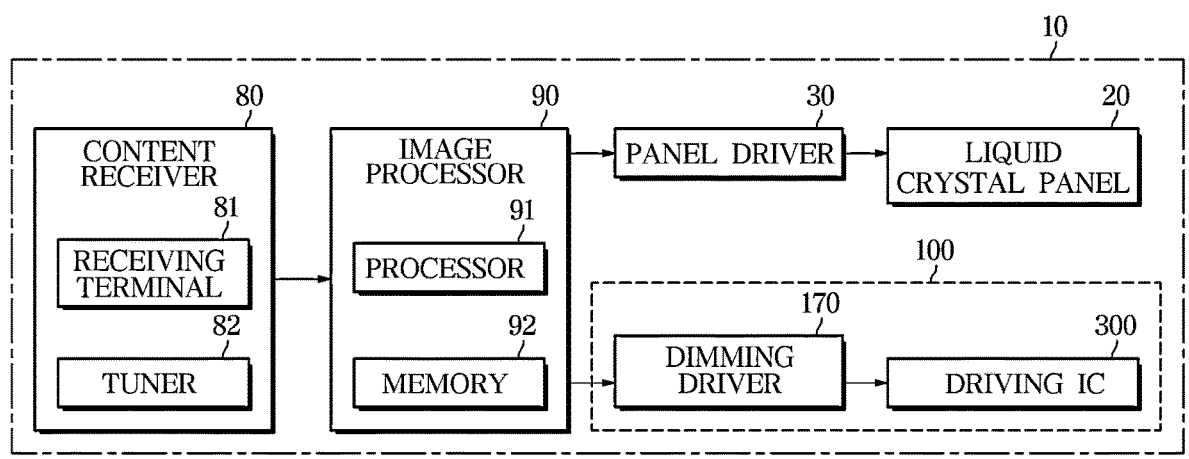
FIG. 6 is a control block diagram illustrating a display apparatus according to an embodiment.
Figure 7:
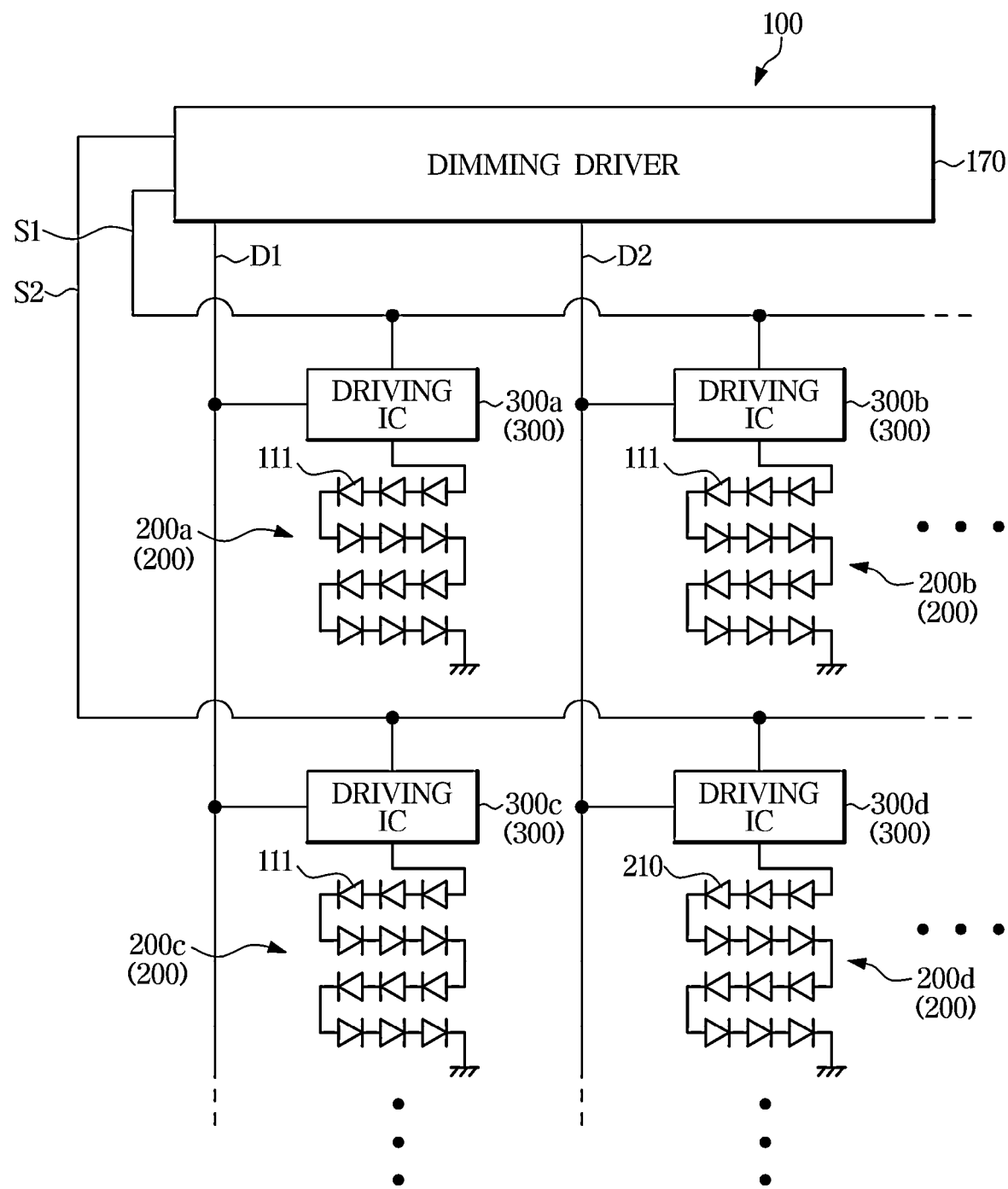
FIG. 7 illustrates a connection structure of a dimming driver, driving integrated circuits (ICs), and dimming blocks of a backlight unit according to an embodiment.
Figure 8:
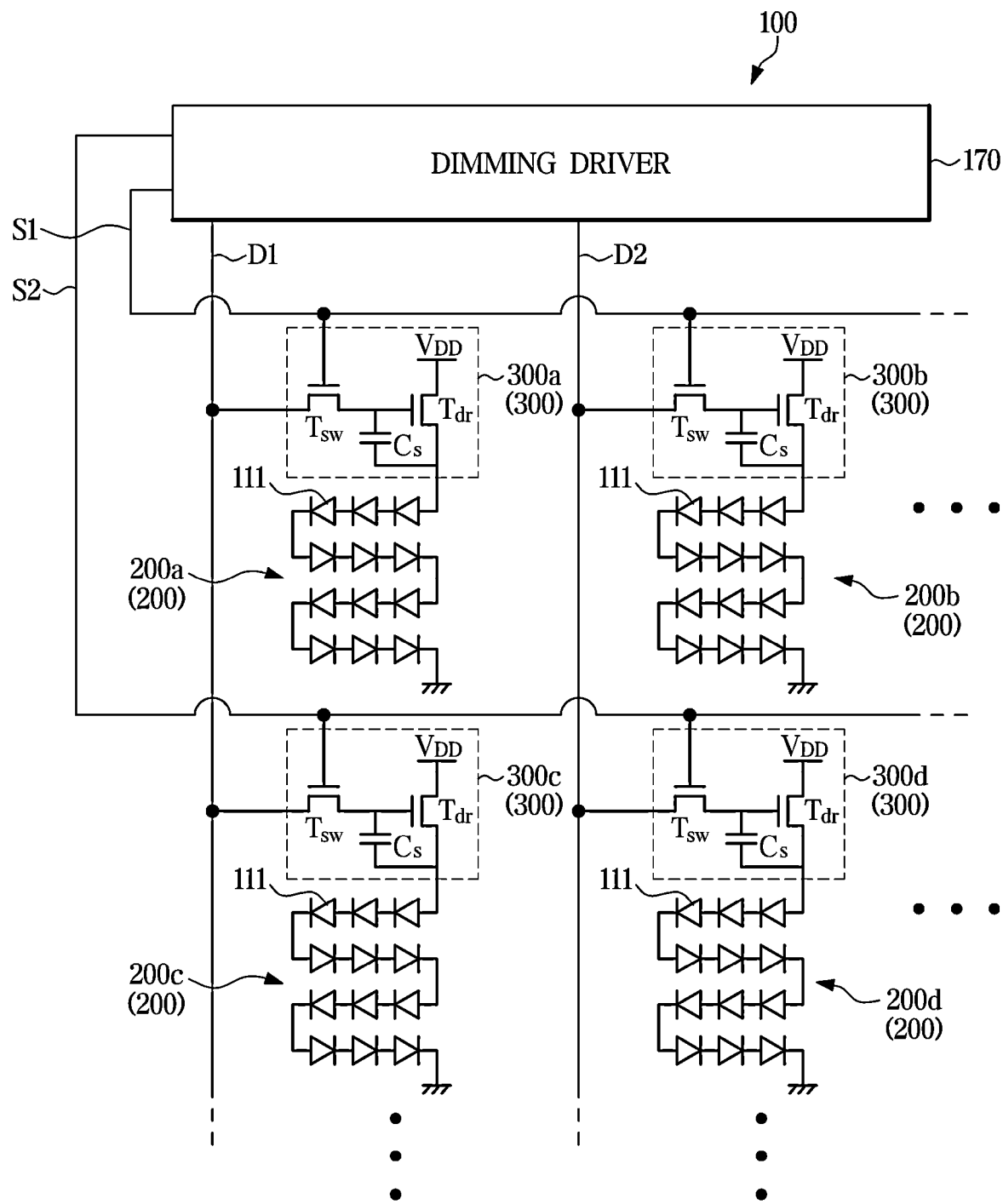
FIG. 8 illustrates an example of a driving IC of a backlight unit according to an embodiment.

FIG. 6 is a control block diagram illustrating a display apparatus 10 according to an embodiment. FIG. 7 illustrates a connection structure of a dimming driver, driving integrated circuits (ICs), and dimming blocks of a backlight unit 100 according to an embodiment. FIG. 8 illustrates an example of a driving IC of a backlight unit 100 according to an embodiment.

Referring to FIG. 6, the display apparatus 10 may include a content receiver 80, an image processor 90, and a panel driver 30, the liquid crystal panel 20, and the backlight unit 100. In this case, the backlight unit 100 may include a dimming driver 170 configured to perform local dimming and a driving integrated chip (IC) 300 for driving the light sources 111.

The content receiver 80 may include a receiving terminal 81 (e.g., a receiving interface) provided to receive a content including a video signal and/or an audio signal from content sources, and a tuner 82.

The receiving terminal 81 may receive a video signal and an audio signal from content sources through a cable. For example, the receiving terminal 81 may include a component (YPbPr/RGB) terminal, a composite (composite video blanking and sync, CVBS) terminal, an audio terminal, a high-definition multimedia interface (HDMI) terminal, and a universal serial bus (USB) terminal.

The tuner 82 may receive a broadcast signal from a broadcast reception antenna or a wired cable, and extract a broadcast signal of a channel selected by a user from among the broadcast signals. For example, among a plurality of broadcast signals received through the broadcast reception antenna or the wired cable, the tuner 82 may output, to the image processor 90, a broadcast signal having a frequency corresponding to a channel selected by a user, and may block broadcast signals having other frequencies.

As described above, the content receiver 80 may receive an image including a video signal and an audio signal from the content sources through the receiving terminal 81 and/or the tuner 82, and may output the image input through the receiving terminal 81 and/or the tuner 82 to the image processor 90.

The image processor 90 includes at least one processor 91 configured to process an input image (image data), and a memory 92 configured to memorize/store data.

The memory 92 may store programs and data for processing a video signal and/or an audio signal, and temporarily stored data generated in processing of a video signal and/or an audio signal.

The memory 92 may include a non-volatile memory such as a Read Only Memory (ROM) and a flash memory, and a volatile memory such as a Static Random Access Memory (S-RAM) and a Dynamic Random Access Memory (D-RAM).

The at least one processor 91 may receive a video signal indicating an input image and/or an audio signal indicating audio from the content receiver 80, and may decode the video signal into image data and may generate dimming data using the image data. In addition, the image data and the dimming data may be output to the panel driver 30 and the dimming driver 170, respectively.

The at least one processor 91 may provide dimming data for local dimming to the backlight unit 100. The dimming data may include information about a luminance of each of the plurality of dimming blocks 200. For example, the dimming data may include information about the intensity of light output from the light sources 111 included in each of the plurality of dimming blocks 200. That is, the dimming data may include information about the magnitude of a current supplied to the light sources 111 included in each of the plurality of dimming blocks 200.

The at least one processor 91 may obtain the dimming data using image data decoded from a video signal.

The at least one processor 91 may convert image data into dimming data in various methods. For example, the at least one processor 91 may divide an image I based on image data into a plurality of image blocks. The number of the plurality of image blocks is equal to the number of the plurality of dimming blocks 200, and each of the plurality of image blocks may correspond to a respective one of the plurality of dimming blocks 200.

The at least one processor 91 may obtain luminance values of the plurality of dimming blocks 200 from the image data of the plurality of image blocks. In addition, the processor 91 may generate dimming data by combining the luminance values of the plurality of dimming blocks 200.

For example, the at least one processor 91 may obtain a luminance value of each of the plurality of dimming blocks 200 based on a maximum value among luminance values of pixels included in each of the image blocks.

One image block may include a plurality of pixels, and image data of the one image block may include image data (e.g., red data, green data, blue data, etc.) of the plurality of pixels. The at least one processor 91 may calculate a luminance value of each of the pixels based on image data of each of the pixels.

The at least one processor 91 may determine a maximum value, among luminance values of pixels included in an image block, as a luminance value of a dimming block corresponding to the image block. For example, the processor 91 may determine a maximum value, among luminance values of pixels included in a first image block, as a luminance value of a first dimming block, and determine a maximum value among luminance values of pixels included in a second image block as a luminance value of a second dimming block.

The at least one processor 91 may generate dimming data by combining luminance values of the plurality of dimming blocks 200.

As described above, at least one processor 91 may decode the video signal acquired by the content receiver 80 into image data and generate dimming data using the image data. In addition, the at least one processor 91 may transmit the image data and the dimming data to the liquid crystal panel 20 and the backlight unit 100, respectively.

That is, the at least one processor 91 may decode an input image input through the content receiver 80 into image data, and generate dimming data corresponding to the input image from the image data. In this case, the dimming driver 170 of the backlight unit 100 may convert the dimming data received from the image processor 90 into a dimming signal representing the magnitude of a current to be supplied to each of the light sources 111 of the dimming block 200 and control the driving IC 300.

As described above, the at least one processor 91 may divide the plurality of light sources 111 into a plurality of dimming blocks 200 and control a current supplied to each of the dimming blocks 200 based on a dimming signal corresponding to an input image.

The at least one processor 91 may predict the temperature of each of the dimming blocks 200 for output of an input image. That is, the at least one processor 91 may simulate the output of an input image, and based on a dimming signal corresponding to the input image and current-specific temperature profile information of the dimming blocks 200, predict the temperature of each of the plurality of dimming blocks 200 according to the output of the input image.

In this case, the current-specific temperature profile information may be information obtained by measuring a temperature change in the dimming block 200 at each different current value over time during a period from a point in time at which supply of a current to the dimming block 200 is started, continuing after the supply of the current to the dimming block 200 is interrupted, until a set time elapses, and may be stored in the memory 92.

In addition, the at least one processor 91 may determine the predicted temperature for each of the dimming blocks 200 using a neural network. Specifically, the at least one processor 91 may predict the temperature of each of the plurality of dimming blocks 200 according to output of the input image, based on an output of a neural network that uses a dimming signal corresponding to an input image and the current-specific temperature profile information of the plurality of dimming blocks 200 as input data.

The at least one processor 91 may update a dimming signal of each of the plurality of dimming blocks 200 such that a current supplied to the dimming block 200 is adjusted based on the predicted temperature of each of the plurality of dimming blocks 200. That is, the at least one processor 91 may update dimming data based on the predicted temperature of each of the dimming blocks 200 based on the predicted temperature of each of the dimming blocks 200, to update a dimming signal supplied to the dimming block 200. In this regard, the at least one processor 91 may update dimming data based on the predicted temperature of each of the dimming blocks 200, thereby updating a dimming signal for controlling the driving IC 300 that adjusts a current supplied to the dimming block 200.

The at least one processor 91 may update the dimming signal of a first dimming block, among the plurality of dimming blocks 200, which has a predicted temperature higher than or equal to a preset value such that a current supplied to the first dimming block decreases.

Conversely, the at least one processor 91 may update the dimming signal of a second dimming block, among the plurality of dimming blocks 200, which has a predicted temperature lower than the preset value such that a current supplied to the second dimming block increases.

For example, the at least one processor 91 may be configured to, when outputting an input image, determine in real time an average cumulative current of each of the plurality of dimming blocks 200, and compare the average cumulative current with a preset reference current to update the dimming signal of each of the plurality of dimming blocks 200.

In this case, the at least one processor 91 according to an embodiment may adjust the average cumulative current, which is to be compared with the reference current, based on the predicted temperature of the dimming block 200 such that the dimming signal is adjusted based on the predicted temperature.

In detail, the at least one processor 91 may determine the weight of each of the plurality of dimming blocks 200 based on the predicted temperature of each of the plurality of dimming blocks 200.

Thereafter, the at least one processor 91 may, when outputting an input image, determine an average cumulative current of each of the plurality of dimming blocks 200, and compare the average cumulative current adjusted by the weight with a preset reference current to update the dimming signal of each of the plurality of dimming blocks 200.

The at least one processor 91 may, based on the average cumulative current adjusted by the weight being greater than or equal to the preset reference current, update the dimming signal such that the current supplied to the dimming block 200 decreases.

Conversely, the at least one processor 91 may, based on the average cumulative current adjusted by the weight being less than or equal to the preset reference current, update the dimming signal such that the current supplied to the dimming block 200 increases.

In this case, with respect to the first dimming block, of which the predicted temperature is higher than or equal to the preset value, the at least one processor 91 may determine the weight of the first dimming block such that the average cumulative current adjusted by the weight is greater than the average cumulative current before the adjustment, and with respect to the second dimming block, of which the predicted temperature is lower than the preset value, the at least one processor 91 may determine the weight of the second dimming block such that the average cumulative current adjusted by the weight is smaller than the average cumulative current before the adjustment.

The at least one processor 91 may divide the plurality of dimming blocks 200 into a plurality of groups, and determine the weight based on a predicted temperature of a center dimming block in each of the plurality of groups.

In this case, the at least one processor 91 may, when outputting an input image, determine an average cumulative current of the center dimming block in each of the plurality of groups, and update dimming signals of all of the dimming blocks belong to the group based on the weight and the average cumulative current of the center dimming block.

The liquid crystal panel 20 includes the plurality of pixels configured to transmit or block light, and the plurality of pixels is disposed in a matrix form. In this regard, the plurality of pixels may be arranged in a plurality of rows and a plurality of columns.

The panel driver 30 may receive image data from the image processor 90 and drive the liquid crystal panel 20 according to the image data. In this regard, the panel driver 30 may convert image data that is indicated by a digital signal (hereinafter referred to as 'digital image data') to an analog image signal that is an analog voltage signal, and may provide the analog image signal to the liquid crystal panel 20. Optical properties (for example, light transmittance) of the plurality of pixels included in the liquid crystal panel 20 may vary according to the analog image signal.

The panel driver 30 may include a timing controller, a data driver, and a scan driver.

The timing controller may receive image data from the image processor 90 and may output image data and a driving control signal to the data driver and the scan driver. The driving control signal may include a scan control signal and a data control signal, and the scan control signal and the data control signal may be used to control the operation of the scan driver and the operation of the data driver, respectively.

The scan driver may receive a scan control signal from the timing controller, and in response to the scan control signal, activate an input of any one row among a plurality of rows in the liquid crystal panel 20. In this regard, the scan driver may convert pixels, which are included in one row among a plurality of pixels arranged in the plurality of rows and the plurality of columns, into a state capable of receiving an analog image signal. In this case, pixels other than the pixels, in which an input is activated by the scan driver, may not receive an analog image signal.

The data driver may receive image data and a data control signal from the timing controller, and in response to the data control signal, the data driver may output image data on the liquid crystal panel 20. For example, the data driver may receive digital image data from the timing controller, and convert digital image data into an analog image signal. In addition, the data driver may provide an analog image signal to pixels that is included in one row and input-activated by the scan driver. In this case, the pixels, in which an input is activated by the scan driver, may receive an analog image signal, and optical properties (for example, light transmittance) of pixels, in which the input is activated, may be changed according to the received analog image signal.

As described above, the panel driver 30 may drive the liquid crystal panel 20 according to image data. Accordingly, an image corresponding to the image data may be displayed on the liquid crystal panel 20.

The dimming driver 170 may receive dimming data from the image processor 90 and drive the backlight unit 100 according to the dimming data. Here, the dimming data may include information about the luminance of each of the plurality of dimming blocks 200, information about the brightness of the light source 111 included in each of the plurality of dimming blocks 200, or information about the magnitude of the current supplied to the light source 111 included in each of the plurality of dimming blocks 200.

The dimming driver 170 may convert dimming data which is indicated by a digital signal (hereinafter referred to as 'digital dimming data'), into an analog dimming signal, which is an analog voltage signal, and provide the analog dimming signal to the dimming block 200. The driving IC 300 may adjust the magnitude of a current supplied to the light source 111 included in each of the plurality of dimming blocks 200 according to the analog dimming signal so that the intensity of light emitted from the light source 111 may be changed.

In particular, the dimming driver 170 may not directly provide the analog dimming signal to each of the plurality of dimming blocks 200, but may sequentially provide the analog dimming signal to the plurality of dimming blocks 200 in an active matrix manner.

As described above, the plurality of dimming blocks 200 may be arranged in a matrix form in the backlight unit 100. In this regard, the plurality of dimming blocks 200 may be arranged in a plurality of rows and a plurality of columns in the backlight unit 100.

The dimming driver 170 may sequentially provide an analog dimming signal to dimming blocks belonging to each of a plurality of rows or sequentially provide an analog dimming signal to dimming blocks belonging to each of a plurality of columns.

For example, the dimming driver 170 may input-activate dimming blocks belonging to any one row of the plurality of dimming blocks 200 and provide an analog dimming signal to the input-activated dimming blocks. Then, the dimming driver 170 may input-activate dimming blocks belonging to another row of the plurality of dimming blocks 200 and provide an analog dimming signal to the input-activated dimming blocks.

The display apparatus 10 may include a dimming driver 170, a plurality of driving ICs 300; 300a, 300b, 300c, and 300d, and a plurality of light sources 111.

The plurality of light sources 111 may include N×M LEDs, and may be divided into a plurality of dimming blocks 200.

The plurality of driving ICs 300 may receive an analog dimming signal from the dimming driver 170, and supply a driving current to the plurality of dimming blocks 200 according to the received analog dimming signal.

A plurality of light sources (LEDs) 111 included in one dimming block 200 may receive a current from the same driving IC 300. For example, a plurality of light sources (LEDs) 111 included in a first dimming block 200a may receive a driving current from a first driving IC 300a. A plurality of light sources (LEDs) 111 included in a second dimming block 200b may receive a driving current from a second driving IC 300b. A plurality of light sources (LEDs) 111 included in a third dimming block 200c may receive a driving current from a third driving IC 300c. A plurality of light sources (LEDs) 111 included in a fourth dimming block 200d may receive a driving current from a fourth driving IC 300d. In the same way, a plurality of light sources (LEDs) 111 belonging to a $k^{th}$ dimming block (k is a natural number) may receive a driving current from a $k^{th}$ driving IC.

Accordingly, the plurality of light sources (LEDs) 111 belonging to one dimming block 200 may be supplied with a driving current having the same magnitude. In addition, the plurality of light sources (LEDs) 111 belonging to one dimming block 200 may emit light having the same intensity.

A plurality of light sources (LEDs) 111 belonging to one dimming block 200 may be connected in series.

For example, assuming that one dimming block 200 includes a first LED, a second LED, a third LED, and a fourth LED, the anode of the first LED may be connected to the driver IC 300, the cathode of the first LED may be connected to the anode of the second LED, the cathode of the second LED may be connected to the anode of the third LED, and the cathode of the third LED may be connected to the anode of the fourth LED, and the cathode of the fourth LED may be connected to the ground.

While an input is activated by the dimming driver 170, the driving ICs 300 may receive an analog dimming signal from the dimming driver 170, and store the received analog dimming signal. While the input is deactivated, the plurality of driving ICs 300 may supply a driving current corresponding to the stored analog dimming signal, to the plurality of light sources (LEDs) 111.

The display apparatus 10 may include a plurality of scan lines, including first scan line S1 and second scan line S2, configured to provide a scan signal from the dimming driver 170 to the plurality of driving ICs 300, and a plurality of data lines, including first data line D1 and second data line D2, configured to provide an analog dimming signal from the dimming driver 170 to the plurality of driving ICs 300.

Driving ICs 300a and 300b, or 300c and 300d for supplying driving currents to light sources (LEDs) 111 of dimming blocks 200a and 200b, or 200c or 200d belonging to the same row may share the same scan line. For example, the first driving IC 300a and the second driving IC 300b may share the first scan line S1, and the third driving IC 300c and the fourth driving IC 300d may share the second scan line S2.

In addition, driving ICs 300a and 300c, or 300b and 300d for supplying driving currents to light sources (LEDs) 111 of dimming blocks 200a and 200c, or 200b or 200d belonging to the same column may share the same data line. For example, the first driving IC 300a and the third driving IC 300b may share the first data line D1, and the second driving IC 300b and the fourth driving IC 300d may share the second data line D2.

The input of the plurality of driving ICs 300 may be activated by the scan signal of the dimming driver 170, and the driving ICs 300 in which the input is activated may receive the analog dimming signal of the dimming driver 170.

In response to receiving the analog dimming signal, the plurality of driving ICs 300 may store the received analog dimming signal, and supply a driving current to the plurality of light sources (LEDs) 111 according to the stored analog dimming signal.

The plurality of driving ICs 300 may include circuits of various topologies to implement the active-matrix driving method.

For example, as shown in FIG. 8, each of the plurality of driving ICs 300 may include a one-capacitor two-transistor (1C2T) topology circuit.

Each of the plurality of driving ICs 300 may include a driving transistor $T_{dr}$, a switching transistor $T_{sw}$, and a storage capacitor $C_s$.

The driving transistor $T_{dr}$ includes an input terminal, an output terminal, and a control terminal. The input terminal of the driving transistor $T_{dr}$ may be connected to a power source $V_{dd}$, and the output terminal may be connected to a plurality of light sources (LEDs) 111. The driving transistor $T_{dr}$ may supply a driving current to the plurality of light sources (LEDs) 111 based on a voltage at the control terminal.

The storage capacitor $C_s$ is provided between the output terminal and the control terminal of the driving transistor $T_{dr}$. The storage capacitor $C_s$ may output a constant voltage by storing input charges. The driving transistor $T_{dr}$ may supply a driving current to the plurality of light sources (LEDs) 111 based on a voltage output by the storage capacitor $C_s$.

The switching transistor $T_{sw}$ also includes an input terminal, an output terminal, and a control terminal. The input terminal of the switching transistor $T_{sw}$ may be connected to a data line and the output terminal of the switching transistor $T_{sw}$ may be connected to the control terminal of the driving transistor $T_{dr}$. For example, the input terminal of the switching transistor $T_{sw}$ may be connected to the first data line D1 or the second data line D2. The control terminal of the switching transistor $T_{sw}$ may be connected to a scan line. For example, the control terminal of the switching transistor $T_{sw}$ may be connected to the first scan line S1 or the second scan line S2.

The switching transistor $T_{sw}$ may be turned on by a scan signal of the scan line and may transmit an analog dimming signal of the data line to the storage capacitor $C_s$ and the driving transistor $T_{dr}$. The analog dimming signal of the data line data line may be input to the control terminal of the driving transistor $T_{dr}$, and the driving transistor $T_{dr}$ may supply a driving current corresponding to the analog dimming signal to the plurality of light sources (LEDs) 111. The storage capacitor $C_s$ may store charges from the analog dimming signal, and output a voltage corresponding to the analog dimming signal.

Thereafter, even when the inputting of the scan signal is stopped and the switching transistor $T_{sw}$ is turned off, the storage capacitor $C_s$ may still output the voltage corresponding to the analog dimming signal, and the driving transistor $T_{dr}$ may still supply the driving current corresponding to the analog dimming signal to the plurality of light sources (LEDs) 111.

A circuit as shown in FIG. 8 is an example of the driving IC 300, and the circuit structure of the driving IC 300 is not limited thereto. For example, the driving IC 300 may include a three-transistor one-capacitor (3T1C) topology circuit in which a third transistor is added to compensate for body effect of the driving transistor $T_{dr}$.

The driving IC 300 may be provided in a single chip in which the circuit shown in FIG. 8 is integrated. In this regard, the circuit shown in FIG. 8 may be integrated in a single semiconductor chip.

Figure 9:
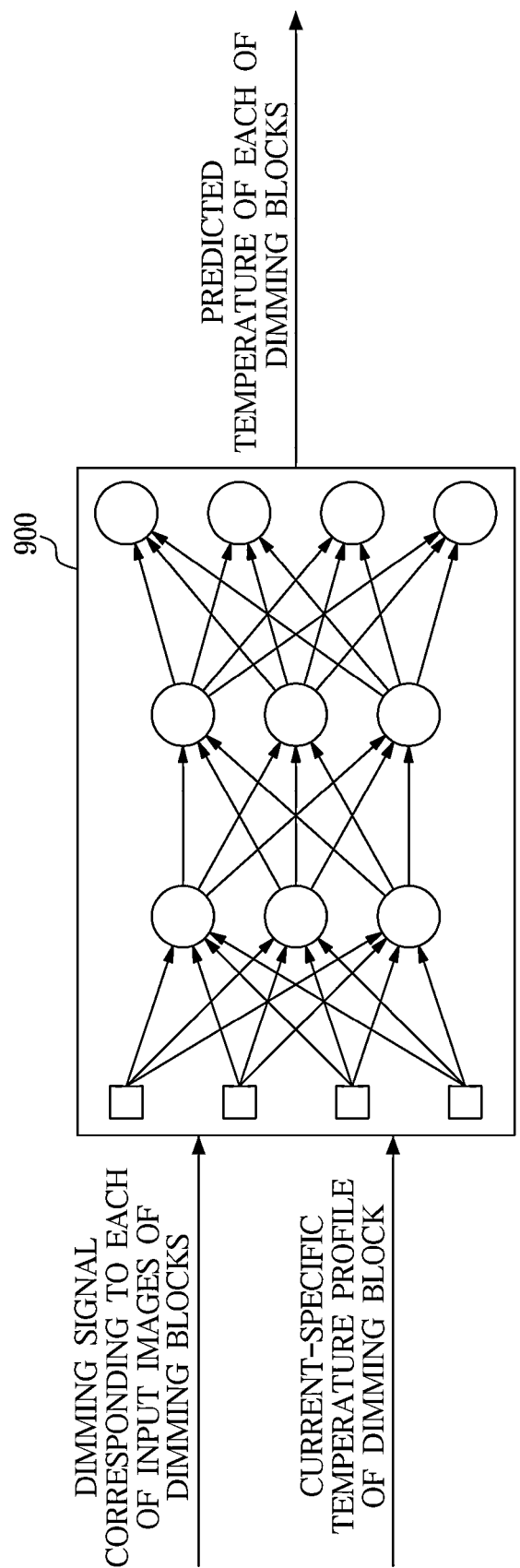
FIG. 9 illustrates a display apparatus which predicts the temperature of each dimming block when outputting an input image based on an output simulation of the input image, according to an embodiment.
Figure 10:
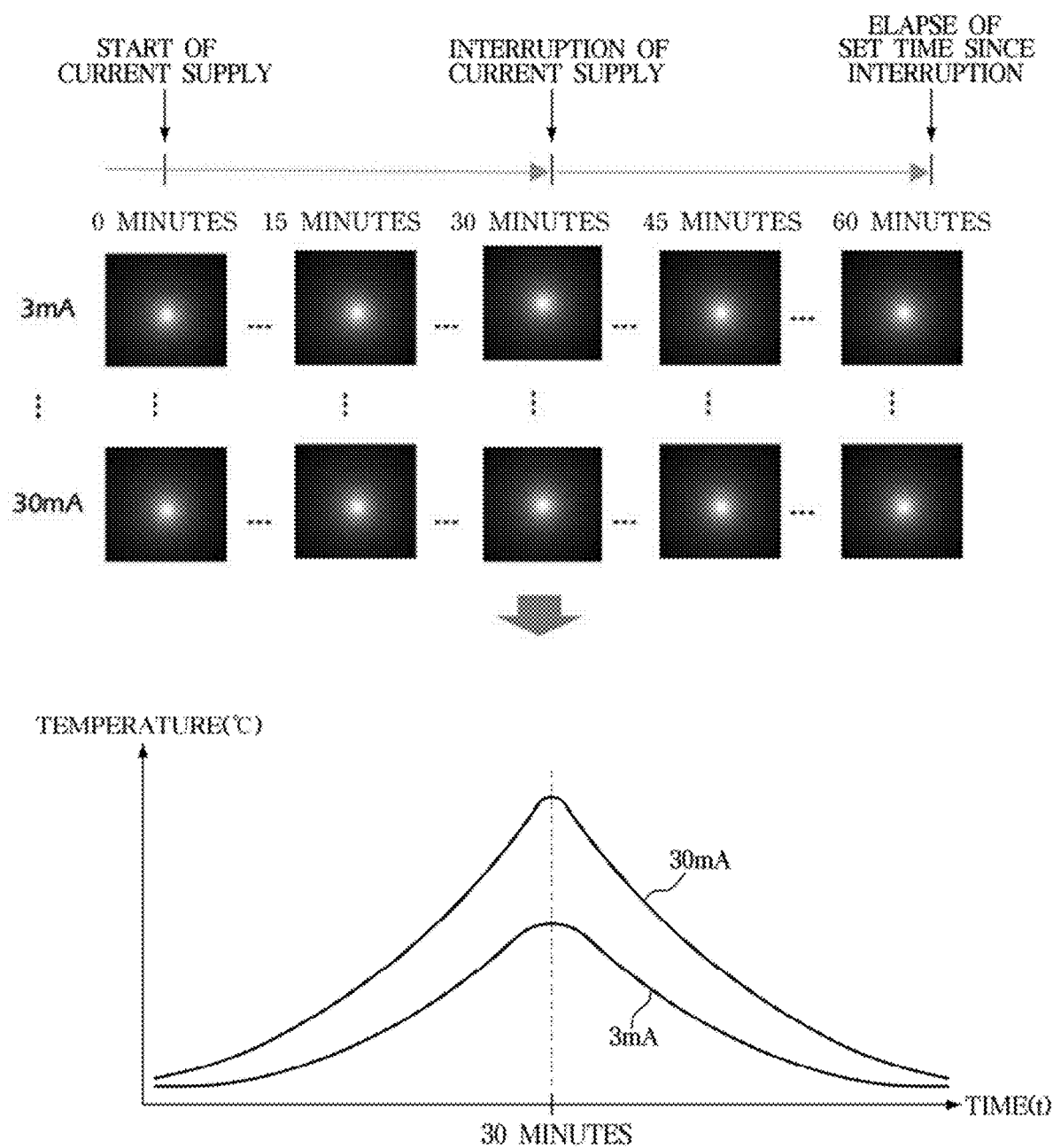
FIG. 10 is a diagram for describing a current-specific temperature profile of a dimming block according to an embodiment.

FIG. 9 illustrates a display apparatus 10, according to an embodiment, which predicts the temperature of each dimming block 200 when outputting an input image based on an output simulation of the input image, and FIG. 10 is a diagram for describing a current-specific temperature profile of a dimming block 200 according to an embodiment.

Referring to FIG. 9, the display apparatus 10 divides a plurality of light sources 111 of a backlight unit 100 into a plurality of dimming blocks 200, and controls a current supplied for each of the dimming blocks 200 based on a dimming signal corresponding to an input image.

The display apparatus 10 may predict the temperature of each of the dimming blocks 200 for output of an input image. That is, the display apparatus 10 may simulate the output of an input image, and based on a dimming signal corresponding to the input image and current-specific temperature profile information of the dimming blocks 200, predict the temperature of each of the plurality of dimming blocks 200 according to the output of the input image.

For example, the current-specific temperature profile information may be information obtained by measuring a temperature change in the dimming block 200 at different current values (3 mA to 30 Ma) over time during a first period from a first point in time (at 0 minutes) at which supply of a current to the dimming block 200 is started to a second point in time (at 30 minutes) at which the supply of the current to the dimming block 200 is interrupted, and a second period in which the current is not supplied to the dimming block 200 from the second point in time to a third point in time. For example, the first time period and the second time period may each be 30 minutes, as shown in FIG. 10. However, embodiments are not limited thereto and the first time period and the second time period may be different time periods, and may be different from each other. For example, the temperature change information may be stored in the memory 92.

That is, the display apparatus 10 may perform a simulation in which an input image is output based on dimming signals corresponding to input images of the plurality of dimming blocks 200, and based on the dimming signal of each of the plurality of dimming blocks 200, identify a current supplied to each of the plurality of dimming blocks 200 for output of the input image, and predict a temperature of each of the dimming blocks 200 based on the identified current and the current-specific temperature profile information of the dimming block 200.

In this case, the display apparatus 10 may determine the predicted temperature for each of the dimming blocks 200 using a neural network 900 as shown in FIG. 9. Specifically, the display apparatus 10 may predict the temperature of each of the plurality of dimming blocks 200 according to output of the input image, based on an output of the neural network 900 that uses a dimming signal corresponding to an input image and the current-specific temperature profile information of the plurality of dimming blocks 200 as input data.

Alternatively, the display apparatus 10, according to an embodiment, may determine the predicted temperature for each of the dimming blocks 200 without using the neural network 900. For example, the display apparatus 10 may predict the temperature of each of the dimming blocks 200 using a current supplied to the dimming block 200, which is indicated by a dimming signal, and a temperature prediction look-up table (LUT) according to current-specific temperature profile information of the dimming block 200.

However, the method of predicting the temperature by the display apparatus 10 is not limited to a neural network or a look-up table, and any algorithm capable of performing a simulation may be applicable without limitation.

Figure 11A:
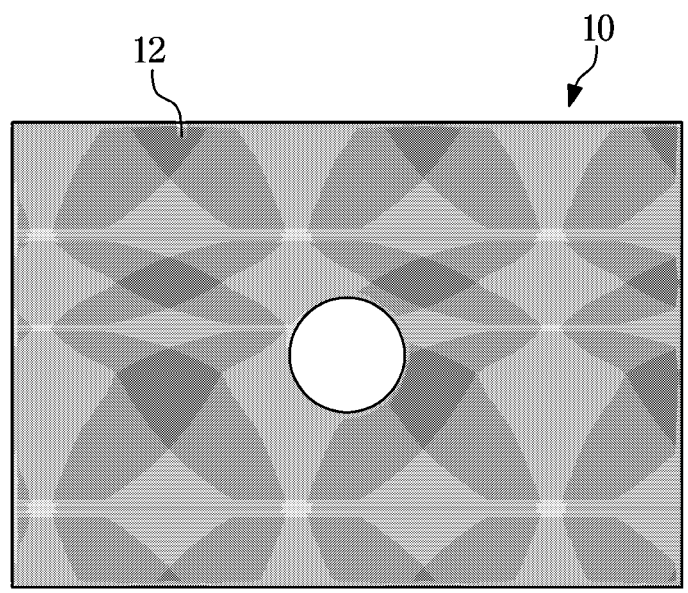
FIGS. 11A and 11B are diagrams for describing an example of a temperature change according to local dimming in a display apparatus according to an embodiment.
Figure 11B:
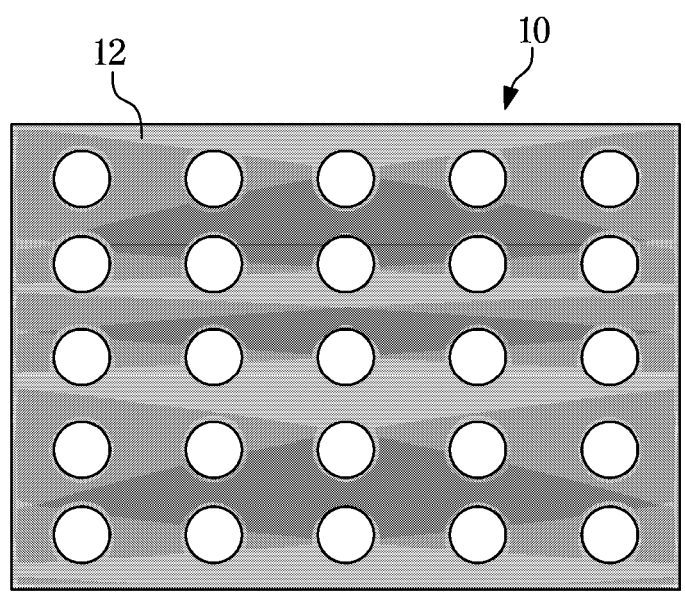
Figure 12:
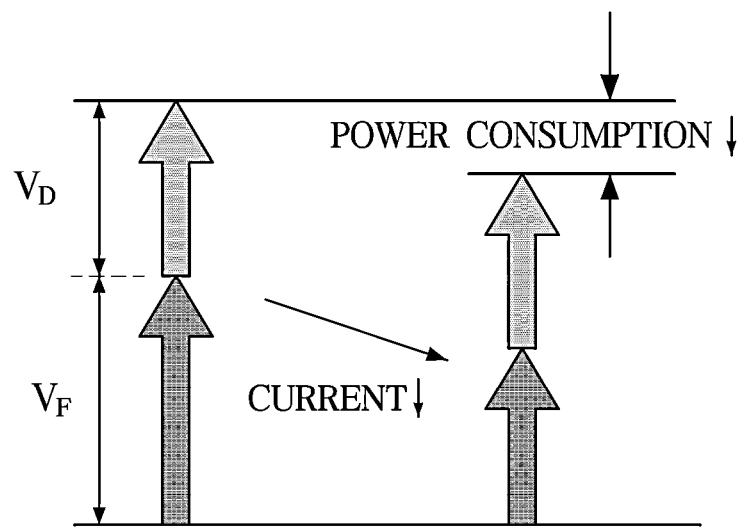
FIG. 12 is a diagram for describing a display apparatus which updates a dimming signal of a dimming block having a high predicted temperature according to an embodiment.
Figure 13:
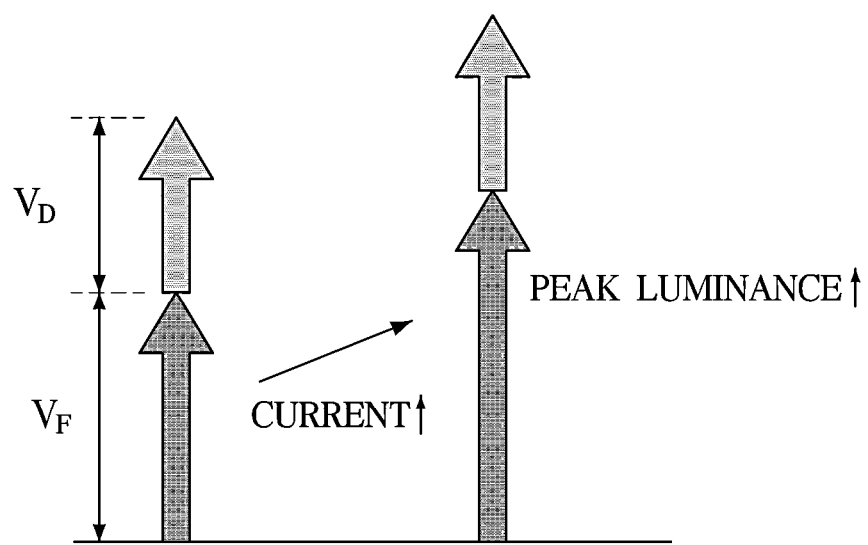
FIG. 13 is a diagram for describing a display apparatus which updates a dimming signal of a dimming block having a low predicted temperature according to an embodiment.

FIGS. 11A and 11B are diagrams for describing an example of a temperature change according to local dimming in a display apparatus 10 according to an embodiment, FIG. 12 is a diagram for describing a display apparatus 10, according to an embodiment, which updates a dimming signal of a dimming block 200 having a high predicted temperature, and FIG. 13 is a diagram for describing a display apparatus, according to an embodiment, which updates a dimming signal of a dimming block 200 having a low predicted temperature.

Referring to FIGS. 11A and 11B, the display apparatus 10 may continuously display an image to be bright in one area on the screen 12, as shown in 11A. The display apparatus 10 may continuously display an image to be bright in a plurality of areas smaller than the one area shown in FIG. 11A on the screen 12, as shown in 11B. For example, the image corresponding to FIG. 11A and the image corresponding to FIG. 11B may have the same global average picture level (APL).

In this case, a peak current may be continuously applied to a dimming block 200 corresponding to the area of the image displayed bright.

Dimming blocks 200 that are driven at the peak current and are grouped together may cause temperature of the dimming blocks 200 to increase, which may cause a rapid increase in the temperature of the display apparatus 10. In some cases, the surface (open cells) of the screen 12 of the display apparatus 10 may melt due to a phase change, which may lead to a fire. In a situation, such as that shown in FIG. 11A, the temperature may be expected to be higher than a set value. In this situation, the current supplied to the dimming block 200 may be decreased to prevent the screen from melting or a fire from occurring.

Dimming blocks 200 that are driven at the peak current and are dispersed may cause the temperature to increase at a rate that is less than that discussed above with respect to FIG. 11A. In a situation, such as that shown in FIG. 11B, the temperature may be expected to be lower than the set value. In this situation, the current supplied to the dimming block 200 may be increased to provide brighter luminance, thereby increasing the contrast ratio.

To this end, the display apparatus 10 may update a dimming signal of each of the plurality of dimming blocks 200 such that a current supplied to the dimming block 200 is adjusted based on the predicted temperature of each of the plurality of dimming blocks 200. That is, the display apparatus 10 may update dimming data based on the predicted temperature of each of the dimming blocks 200 based on the predicted temperature of each of the dimming blocks 200, to update a dimming signal supplied to the dimming block 200. In this regard, the display apparatus 10 may update dimming data based on the predicted temperature of each of the dimming blocks 200, thereby updating a dimming signal for controlling the driving IC 300 that adjusts a current supplied to the dimming block 200.

As shown in FIG. 12, the display apparatus 10 may update a dimming signal of a first dimming block, among the plurality of dimming blocks 200, which has a predicted temperature higher than or equal to a preset value such that a current supplied to the first dimming block decreases. In this case, a constant voltage $V_F$ of the light sources 111 of the first dimming block is reduced and thus a current supplied to the light source s111 is reduced, and power consumption in the first dimming block is also reduced.

Conversely, as shown in FIG. 13, the display apparatus 10 may update a dimming signal of a second dimming block, among the plurality of dimming blocks 200, which has a predicted temperature lower than the preset value such that a current supplied to the second dimming block increases. In this case, a constant voltage $V_F$ of the light sources 111 of the second dimming block is increased and thus a current supplied to the light sources 111 is increased, by which the contrast ratio may be further improved due to the increase in luminance of the second dimming block.

Figure 15:
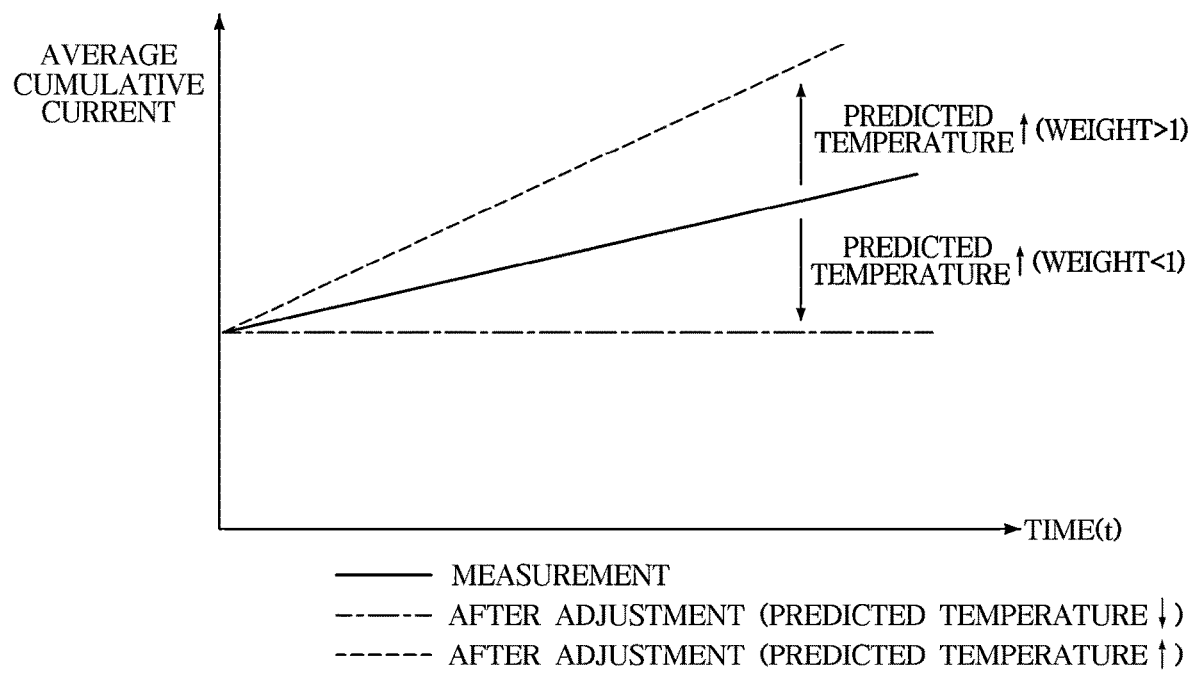
FIG. 15 is a diagram for describing a display apparatus which adjusts an average cumulative current by determining the weight based on a temperature prediction result according to an embodiment.

FIG. 14 is a diagram for describing a display apparatus 10 which adjusts a dimming signal according to an embodiment, and FIG. 15 is a diagram for describing a display apparatus 10, according to an embodiment, which adjusts an average cumulative current by determining the weight based on a temperature prediction result.

Referring to FIG. 14, the display apparatus 10 may be configured to, when outputting an input image, determine in real time an average cumulative current of each of the plurality of dimming blocks 200, compare the average cumulative current with a preset reference current, and update the dimming signal of each of the plurality of dimming blocks 200 based on the comparison.

That is, the display apparatus 10 may, in response to one dimming block 200 of which the average cumulative current is greater than a reference current value while an input image is being output, update a dimming signal of the corresponding dimming block 200 such that a current supplied to the corresponding dimming block 200 is reduced.

Conversely, the display apparatus 10 may, in response to one dimming block 200 of which the average cumulative current is less than the reference current value while an input image is being output, update a dimming signal for the corresponding dimming block 200 such that a current supplied to the corresponding dimming block 200 is increased.

In this case, the display apparatus 10 according to an embodiment may adjust the average cumulative current, which is to be compared with the reference current, based on the predicted temperature of the dimming block 200 such that the dimming signal is adjusted based on the predicted temperature as shown in FIG. 15.

In detail, the display apparatus 10 may determine the weight of each of the plurality of dimming blocks 200 based on the predicted temperature of each of the plurality of dimming blocks 200.

Thereafter, the display apparatus 10 may, when outputting an input image, determine an average cumulative current of each of the plurality of dimming blocks 200 and compare the average cumulative current adjusted by the weight with a preset reference current to update the dimming signal of each of the plurality of dimming blocks 200.

The display apparatus 10 may, based on the average cumulative current adjusted by the weight being greater than or equal to the preset reference current, update the dimming signal such that the current supplied to the dimming block 200 decreases.

Conversely, the display apparatus 10 may, based on the average cumulative current adjusted by the weight being less than the preset reference current, update the dimming signal such that the current supplied to the dimming block 200 increases.

In this case, with respect to the first dimming block, of which the predicted temperature is higher than or equal to the preset value, the display apparatus 10 may determine the weight of the first dimming block such that the average cumulative current adjusted by the weight is greater than the average cumulative current before the adjustment. For example, the display apparatus 10 may set the weight to be greater than 1 when the predicted temperature is greater than the preset value. Through this, the display apparatus 10 may allow the adjusted average cumulative current, which is to be compared with the reference current, to preemptively exceed the reference current. Based on the adjusted average cumulative current exceeding the reference current, the display apparatus 10 may update the dimming signal such that the current supplied to the dimming block 200 deceases, thereby preventing the screen from melting or a fire from occurring due to a temperature rise.

With respect to the second dimming block, of which the predicted temperature is lower than the preset value, the display apparatus 10 may determine the weight of the second dimming block such that the average cumulative current adjusted by the weight is smaller than the average cumulative current before the adjustment. For example, the display apparatus 10 may set the weight to be smaller than 1 when the predicted temperature is lower than the preset value. Through this, the display apparatus 10 may allow the adjusted average cumulative current, which is to be compared with the reference current, to be less than the reference current. Based on the adjusted average cumulative current being less than the reference current, the display apparatus 10 may update the dimming signal such that the current supplied to the dimming block 200 increases, thereby increasing the current supplied to the dimming block 200 and increasing the luminance, thereby increasing the contrast ratio.

Figure 16:
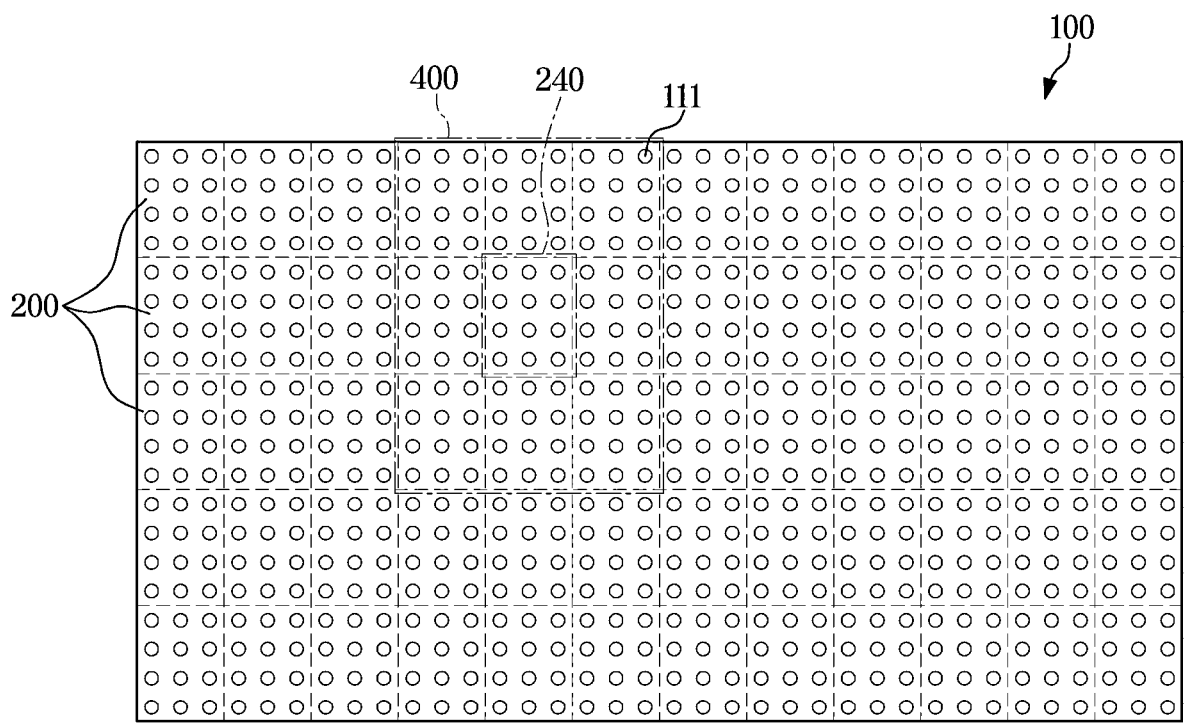
FIG. 16 is a diagram for describing a display apparatus which updates a dimming signal for each group of dimming blocks according to an embodiment.

FIG. 16 is a diagram for describing a display apparatus 10, according to an embodiment, which updates a dimming signal for each group of dimming blocks.

Referring to FIG. 16, the display apparatus 10 may divide the plurality of dimming blocks 200 into a plurality of groups 400, and determine a respective weight for each of the plurality of groups based on a predicted temperature of a center dimming block 240 in a corresponding group of the plurality of groups 400.

In this case, the display apparatus 10 may, when outputting the input image, determine an average cumulative current of the center dimming block 240 in each of the plurality of groups 400, and update dimming signals of all of the dimming blocks 200 belong to the group 400 based on the weight and the average cumulative current of the center dimming block 240.

That is, the display apparatus 10 may multiply the average cumulative current of the center dimming block 240 by the weight determined based on the predicted temperature of the center dimming block 240 to adjust the average cumulative current, compare the adjusted average cumulative current with a reference current, and update dimming signals of all of the dimming blocks 200 belonging to the group 400 based on the comparison.

As described above, the display apparatus 10 may update the dimming signals of the entire group 400 by predicting only the temperature of a specific dimming block (e.g., the center dimming block 240) belonging to the group 400. For example, the display apparatus 10 may not predict the temperature of dimming blocks that are not in a center of a group, thereby increasing data processing efficiency.

Hereinafter, an embodiment of a method of controlling a display apparatus 10 according to an aspect will be described. The display apparatus 10 according to the above-described embodiment may be used in the method of controlling the display apparatus 10. Accordingly, the contents described above with reference to FIGS. 1 to 16 may be equally applied to the method of controlling the display apparatus 10.

Figure 17:
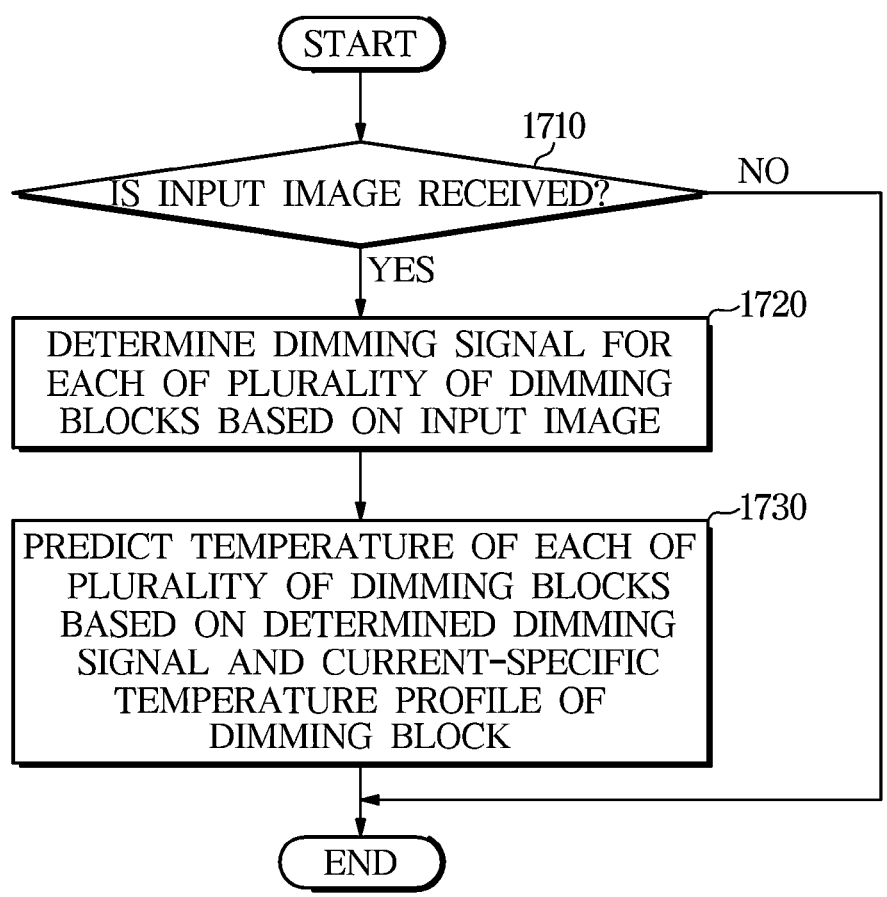
FIG. 17 is a flowchart illustrating predicting a temperature of a dimming block in a method of controlling a display apparatus according to an embodiment.

FIG. 17 is a flowchart illustrating an example of predicting a temperature of a dimming block 200 in a method of controlling a display apparatus 10 according to an embodiment.

Referring to FIG. 17, the display apparatus 10 may, upon receiving an input image (YES in operation 1710), determine a dimming signal of each of the plurality of dimming blocks 200 based on the input image (1720).

Specifically, the display apparatus 10 may, upon receiving an input image through the content receiver 80, determine image data by decoding the input image, determine dimming data of each of the dimming blocks 200 based on the image data, and determine a dimming signal of each of the dimming blocks 200 corresponding to the input image based on the dimming data.

In this case, the dimming signal may represent the magnitude of a current supplied to each of the dimming block 200.

The display apparatus 10 may predict the temperature of each of the plurality of dimming blocks 200 based on the determined dimming signal and the current-specific temperature profile of the dimming blocks 200 (1730).

In this case, the current-specific temperature profile information may be information obtained by measuring a temperature change in the dimming block 200 at each different current value over time during a period from a point in time at which supply of a current to the dimming block 200 is started, continuing after the supply of the current the dimming block 200 is interrupted, until a set time elapses, and may be stored in the memory 92.

In addition, the display apparatus 10 according to an embodiment may determine the predicted temperature for each of the dimming blocks 200 using a neural network. Specifically, the display apparatus 10 may predict the temperature of each of the plurality of dimming blocks 200 according to output of the input image, based on an output of a neural network that uses a dimming signal corresponding to an input image and the current-specific temperature profile information of the plurality of dimming blocks 200 as input data.

Figure 18:
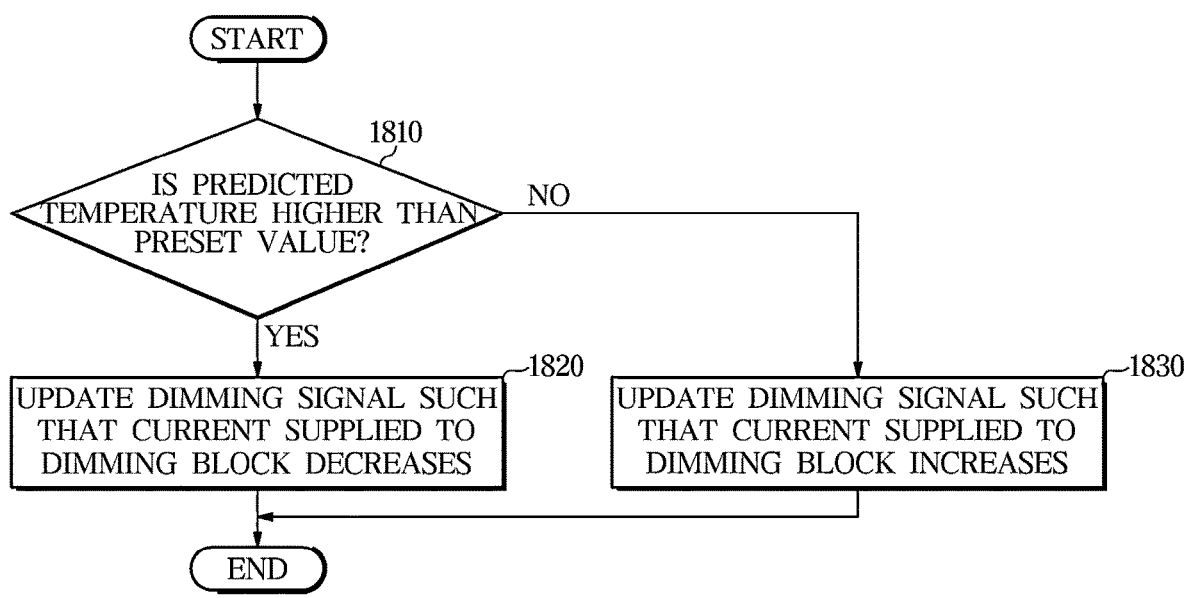
FIG. 18 is a flowchart illustrating adjusting a current supplied to a dimming block based on temperature prediction of a dimming block in a method of controlling a display apparatus according to an embodiment.

FIG. 18 is a flowchart illustrating an example of adjusting a current supplied to a dimming block 200 based on temperature prediction of a dimming block 200 in a method of controlling a display apparatus 10 according to an embodiment.

Referring to FIG. 18, the display apparatus 10 may, in response to the predicted temperature being higher than or equal to a preset value (YES in operation 1810), update the dimming signal such that a current supplied to the dimming block 200 decreases.

Conversely, the display apparatus 10 may, in response to the predicted temperature being lower than the preset value (NO in operation 1810), update the dimming signal such that a current supplied to the dimming block 200 increases.

Figure 19:
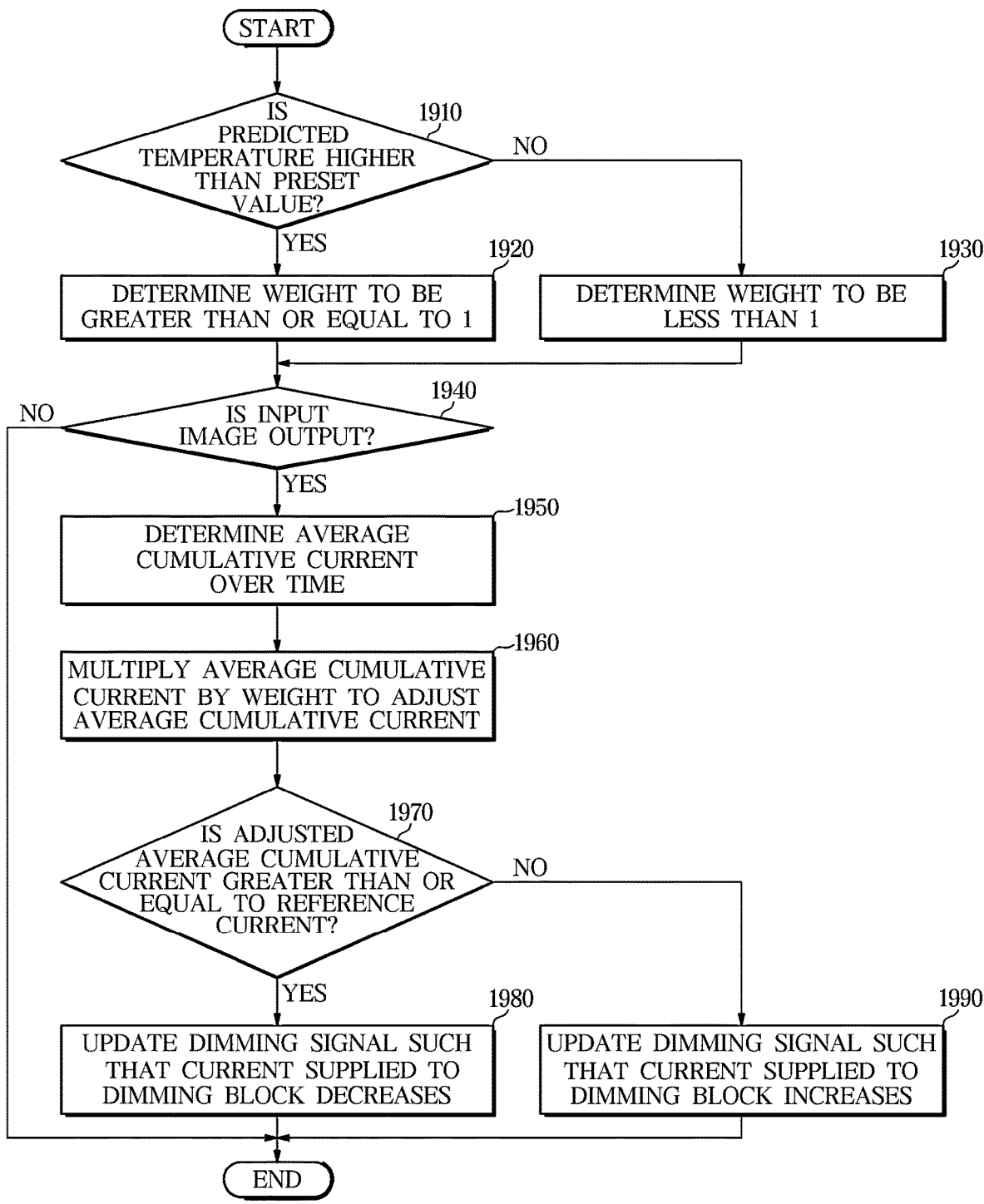
FIG. 19 is a flowchart illustrating an example of adjusting a current supplied to a dimming block based on temperature prediction of a dimming block in a method of controlling a display apparatus according to an embodiment.

FIG. 19 is a flowchart illustrating an example of adjusting a current supplied to a dimming block based on temperature prediction of a dimming block 200 in a method of controlling a display apparatus 10 according to an embodiment.

Referring to FIG. 19, the display apparatus 10 may, in response to the predicted temperature being higher than or equal to a preset value (YES in operation 1910), determine a weight greater than or equal to 1 as the weight of the dimming block 200 (1920).

Conversely, the display apparatus 10 may, in response to the predicted temperature being lower than the preset value (NO in operation 1910), determine a weight less than 1 as the weight of the dimming block 200 (1923).

In this case, the display apparatus 10 may, when outputting an input image (1940), determine an average cumulative current of each of the dimming blocks 200 over time (1950), and multiply the average cumulative current by the weight determined in operation 1920 or 1930 to adjust the average cumulative current (1960).

The display apparatus 10 may, in response to the adjusted average cumulative current being greater than or equal to a reference current (YES in operation 1970), update the dimming signal such that the current supplied to the dimming block 200 decreases (1980).

Conversely, the display apparatus 10 may, in response to the adjusted average cumulative current being less than the reference current (NO in operation 1970), update the dimming signal such that the current supplied to the dimming block 200 increases (1990).

Embodiments may be embodied in the form of a recording medium storing instructions executable by a computer. The instructions may contain a code made by a compiler or a code executable by an interpreter. The instructions may be stored in the form of program code and, when executed by a processor, may generate a program module to perform the operations of the disclosed embodiments. The recording medium may be embodied as a computer-readable recording medium.

The computer-readable recording medium may be non-transitory, and includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the display apparatus and the method of controlling the same are implemented to, based on a dimming signal for each of dimming blocks determined in image data and current-specific temperature profile information of the dimming blocks, predict a temperature of each of the dimming blocks for output of an image, and adjust a current supplied to the dimming block based on the predicted temperature when outputting an image, thereby preventing a temperature rise due to a peak current driving in some areas according to local dimming from causing inefficiency of power or damage to a screen.

While aspects of embodiments have been particularly shown and described, it will be understood that various changes in form and details may be made therein without departing from the spirit and scope of the following claims.

What is claimed is:

1. A display apparatus comprising:
   a liquid crystal panel;
   a backlight unit comprising a plurality of light sources provided on an upper surface of a substrate and configured to emit light to the liquid crystal panel; and
   at least one processor configured to:
      identify a plurality of dimming blocks, each of which comprises at least one light source among the plurality of light sources;
      generate a dimming signal according to luminance values obtained from an input image;
      predict a temperature for each of the plurality of dimming blocks based on the dimming signal and current-specific temperature profile information corresponding to the plurality of dimming blocks;
      update the dimming signal based on the temperature predicted for each of the plurality of dimming blocks; and
      control a supply current for each of the plurality of dimming blocks based on the dimming signal.

2. The display apparatus of claim 1, wherein the plurality of dimming blocks comprises a first dimming block and a second dimming block,
   wherein the dimming signal comprises a first dimming signal corresponding to the first dimming block and a second dimming signal corresponding to the second dimming block, and
   wherein the at least one processor is further configured to:
      update the first dimming signal to reduce a first supply current of the first dimming block based on a first predicted temperature for the first dimming block being higher than or equal to a preset value; and
      update the second dimming signal to increase a second supply current of the second dimming block based on a second predicted temperature for the second dimming block being lower than the preset value.

3. The display apparatus of claim 2, wherein the at least one processor is further configured to identify a weight of each of the plurality of dimming blocks based on the temperature predicted for each of the plurality of dimming blocks.

4. The display apparatus of claim 3, wherein the at least one processor is further configured to:
   identify an average cumulative current for each of the plurality of dimming blocks; and
   update the dimming signal to control the supply current for each of the plurality of dimming blocks based on a comparison of a preset reference current and the average cumulative current adjusted by the weight.

5. The display apparatus of claim 4, wherein the at least one processor is further configured to, based on the average cumulative current adjusted by the weight for a third dimming block, among the plurality of dimming blocks, being greater than or equal to the preset reference current, update the dimming signal to decrease a current supplied to the third dimming block.

6. The display apparatus of claim 4, wherein the at least one processor is further configured to, based on the average cumulative current adjusted by the weight for a third dimming block, among the plurality of dimming blocks, being less than the preset reference current, update the dimming signal to increase a current supplied to the third dimming block.

7. The display apparatus of claim 4, wherein the at least one processor is further configured to:
   identify the weight of the first dimming block to increase the average cumulative current for the first dimming block; and
   identify the weight of the second dimming block to decrease the average cumulative current for the second dimming block.

8. The display apparatus of claim 2, wherein the at least one processor is further configured to:
   divide the plurality of dimming blocks into a plurality of groups; and
   identify a weight that is shared by the plurality of dimming blocks provided in a first group of the plurality of groups based on a predicted temperature of a center dimming block in the first group.

9. The display apparatus of claim 8, wherein the at least one processor is further configured to identify an average cumulative current of the center dimming block in the first group, and based on the weight and the average cumulative current of the center dimming block, update the dimming signal to control each of the plurality of dimming blocks provided in the first group.

10. The display apparatus of claim 1, wherein the at least one processor is further configured to obtain the current-specific temperature profile information by measuring a temperature change in a dimming block at a plurality of different current values over time during a first period from a first point in time at which supply of a current to the dimming block is started to a second point in time at which the supply of the current to the dimming block is interrupted, and a second period from the second point in time to a third point in time.

11. A display apparatus comprising:
   a liquid crystal panel;
   a backlight unit comprising a plurality of light sources provided on an upper surface of a substrate and configured to emit light to the liquid crystal panel; and
   at least one processor configured to:
      identify a plurality of dimming blocks, each of which comprises at least one light source among the plurality of light sources;
      predict a temperature for each of the plurality of dimming blocks based on a dimming signal corresponding to an input image and current-specific temperature profile information corresponding to the plurality of dimming blocks;
      update the dimming signal based on the temperature predicted for each of the plurality of dimming blocks; and
      control a supply current for each of the plurality of dimming blocks based on the dimming signal,
   wherein the at least one processor is further configured to predict the temperature of each of the plurality of dimming blocks based on an output of a neural network that uses the dimming signal corresponding to the input image and the current-specific temperature profile information of the plurality of dimming blocks as input data.

12. A method of controlling a display apparatus including a liquid crystal panel, and a backlight unit including a plurality of light sources configured to emit light to the liquid crystal panel, the method comprising:
   identifying a plurality of dimming blocks, each of which comprises at least one light source among the plurality of light sources;
   generating a dimming signal according to luminance values obtained from an input image;
   predicting a temperature for each of the plurality of dimming blocks based on the dimming signal and current-specific temperature profile information corresponding to the plurality of dimming blocks;
   updating the dimming signal based on the temperature predicted for each of the plurality of dimming blocks; and
   controlling a supply current for each of the plurality of dimming blocks based on the dimming signal.

13. The method of claim 12, wherein the plurality of dimming blocks includes a first dimming block and a second dimming block,
   wherein the dimming signal includes a first dimming signal corresponding to the first dimming block and a second dimming signal corresponding to the second dimming block, and
   wherein the updating the dimming signal comprises:
      updating the first dimming signal to reduce a first supply current of the first dimming block based on a first predicted temperature for the first dimming block being higher than or equal to a preset value; and
      updating the second dimming signal to increase a second supply current of the second dimming block based on a second predicted temperature for the second dimming block being lower than the preset value.

14. The method of claim 13, wherein the updating the dimming signal comprises:
   identifying a weight of each of the plurality of dimming blocks based on the temperature predicted for each of the plurality of dimming blocks;
   identifying an average cumulative current for each of the plurality of dimming blocks when outputting the input image; and
   updating the dimming signal to control the supply current for each of the plurality of dimming blocks based on a comparison of a preset reference current and the average cumulative current adjusted by the weight.

15. The method of claim 14, wherein the updating the dimming signal comprises, based on the average cumulative current adjusted by the weight for a third dimming block, among the plurality of dimming blocks, being greater than or equal to the preset reference current, updating the dimming signal to decrease a current supplied to the third dimming block.

16. The method of claim 14, wherein the updating the dimming signal comprises, based on the average cumulative current adjusted by the weight for a third dimming block, among the plurality of dimming blocks, being less than the preset reference current, updating the dimming signal to increase a current supplied to the third dimming block.

17. The method of claim 14, wherein the updating the dimming signal comprises:
   identifying the weight of the first dimming block to decrease the average cumulative current for the first dimming block; and
   identifying the weight of the second dimming block to decrease the average cumulative current for the second dimming block.

18. The method of claim 13, wherein the updating the dimming signal comprises:
   dividing the plurality of dimming blocks into a plurality of groups;

identifying a weight that is shared by the plurality of dimming blocks provided in a first group of the plurality of groups based on a predicted temperature of a center dimming block in the first group;

identifying an average cumulative current of the center dimming block in the first group; and updating the dimming signal to control each of the plurality of dimming blocks provided in the first group based on the weight and the average cumulative current of the center dimming block.

19. The method of claim 12, wherein the current-specific temperature profile information comprises information obtained by measuring a temperature change in a dimming block at a plurality of different current values over time during a first period from a first point in time at which supply of a current to the dimming block is started to a second point in time at which the supply of the current to the dimming block is interrupted, and a second period from the second point in time to a third point in time.

20. The method of claim 12, wherein the predicting the temperature for each of the plurality of dimming blocks comprises providing is performed based on an output of a neural network that uses the dimming signal corresponding to the input image and the current-specific temperature profile information of the plurality of dimming blocks as input data.

* * * * *